United States Patent
Danilov et al.

(10) Patent No.: US 11,340,792 B2
(45) Date of Patent: May 24, 2022

(54) ORDERED EVENT STREAM MERGING

(71) Applicant: EMC IP Holding Company LLC, Hopkinton, MA (US)

(72) Inventors: Mikhail Danilov, Saint Petersburg (RU); Konstantin Buinov, Prague (CZ)

(73) Assignee: EMC IP HOLDING COMPANY LLC, Hopkinton, MA (US)

(*) Notice: Subject to any disclaimer, the term of this patent is extended or adjusted under 35 U.S.C. 154(b) by 32 days.

(21) Appl. No.: 16/944,089

(22) Filed: Jul. 30, 2020

(65) Prior Publication Data

US 2022/0035533 A1    Feb. 3, 2022

(51) Int. Cl.
*G06F 3/06* (2006.01)

(52) U.S. Cl.
CPC ............ *G06F 3/0611* (2013.01); *G06F 3/067* (2013.01); *G06F 3/0617* (2013.01);
(Continued)

(58) Field of Classification Search
CPC ...... G05B 13/00–048; G05B 15/00–02; G05B 17/00–02; G06F 1/00–3296;
(Continued)

(56) References Cited

U.S. PATENT DOCUMENTS

| | | | | |
|---|---|---|---|---|
| 3,617,587 A | * | 11/1971 | Nayar | ............... B01J 2/04 75/333 |
| 5,826,977 A | * | 10/1998 | Fowler | ............... B01F 5/0641 366/348 |

(Continued)

FOREIGN PATENT DOCUMENTS

| | | |
|---|---|---|
| CA | 2672879 | 4/2008 |
| CN | 1708029 | 12/2005 |

(Continued)

OTHER PUBLICATIONS

Making Sense of Stream Processing The Philosophy Behind Apache Kafka and Scalable Stream Data Platforms; Kleppmann, Martin; Mar. 4, 2016; retrieved from https://hashingit.com/elements/research-resources/2016-03-04-making-sense-of-stream-processing.pdf on Nov. 5, 2021 (Year: 2016).*

(Continued)

*Primary Examiner* — Daniel C. Chappell
(74) *Attorney, Agent, or Firm* — Amin, Turocy & Watson, LLP

(57) ABSTRACT

Merging of portions of ordered event streams is disclosed. The disclosed merging of events can limit loss of order of events from streams in exchange for reduced computational load by grouping events according to a pseudo-epoch, wherein events are stored according to a scheme, even though the grouping can result reading events in a different order that that in which the events were written. However, by grouping the events, there can be fewer transitions between storage schemes when reading events than if they were read in the same order in which they were written, thereby reducing computational load. Moreover, restraints on the loss of order can be imposed by selecting a maximum progress window and generally restricting groups from comprising events two different storage schemes. Where events can be moved to archival storage, reducing storage scheme transitions can be of further benefit and speed access times of archived events.

20 Claims, 10 Drawing Sheets

(52) U.S. Cl.
CPC .......... *G06F 3/0629* (2013.01); *G06F 3/0638* (2013.01); *G06F 3/0653* (2013.01); *G06F 3/0659* (2013.01)

(58) Field of Classification Search
CPC ............... G06F 3/00; G06F 3/06–0689; G06F 5/00–16; G06F 8/00–78; G06F 9/00–548; G06F 11/00–3696; G06F 12/00–16; G06F 13/00–4295; G06F 15/00–825; G06F 16/00–986; G06F 17/00–40; G06F 21/00–88; G06F 2009/3883; G06F 2009/45562–45595; G06F 2015/761–768; G06F 2201/00–885; G06F 2206/00–20; G06F 2209/00–549; G06F 2211/00–902; G06F 2212/00–7211; G06F 2213/00–4004; G06F 2216/00–17; G06F 2221/00–2153; G06K 9/00–82; G06N 3/00–126; G06N 5/00–048; G06N 7/00–08; G06N 10/00; G06N 20/00–20; G06N 99/00–007; G11B 20/00–24; G11B 33/00–1493; G11C 7/00–24; G11C 11/00–5692; G11C 13/00–06; G11C 14/00–009; G11C 15/00–06; G11C 16/00–3495; G11C 17/00–18; G11C 2207/00–229; G11C 2216/00–30
See application file for complete search history.

(56) References Cited

U.S. PATENT DOCUMENTS

| | | | |
|---|---|---|---|
| 8,572,091 B1 | 10/2013 | Sivasubramanian et al. | |
| 8,655,825 B2 | 2/2014 | Roesch et al. | |
| 8,825,848 B1 | 9/2014 | Dotan et al. | |
| 9,514,018 B2 | 12/2016 | Sikri | |
| 9,639,589 B1 | 5/2017 | Theimer | |
| 9,753,932 B1 | 9/2017 | Brow et al. | |
| 9,898,482 B1 | 2/2018 | Bono | |
| 9,965,215 B1 | 5/2018 | Vazhenin et al. | |
| 10,565,208 B2 | 2/2020 | Triou, Jr. et al. | |
| 10,860,457 B1 | 12/2020 | Evenson | |
| 10,867,033 B2 | 12/2020 | Keren et al. | |
| 11,016,826 B2 | 5/2021 | Lehmann | |
| 11,194,638 B1 | 12/2021 | Danilov et al. | |
| 2004/0199524 A1 | 10/2004 | Rys et al. | |
| 2005/0055519 A1 | 3/2005 | Stuart et al. | |
| 2007/0220518 A1 | 9/2007 | Verbowski et al. | |
| 2008/0184262 A1* | 7/2008 | Ginis ................... | H04L 41/147 719/314 |
| 2008/0301135 A1 | 12/2008 | Alves et al. | |
| 2009/0182784 A1 | 7/2009 | Rohit et al. | |
| 2010/0083098 A1 | 4/2010 | Leme et al. | |
| 2010/0125794 A1 | 5/2010 | Hampton et al. | |
| 2011/0126099 A1 | 5/2011 | Anderson et al. | |
| 2011/0131588 A1 | 6/2011 | Allam et al. | |
| 2011/0249147 A1 | 10/2011 | Ishii | |
| 2012/0102503 A1 | 4/2012 | Meijer et al. | |
| 2012/0109985 A1 | 5/2012 | Chandrasekaran | |
| 2013/0226931 A1 | 8/2013 | Hazel et al. | |
| 2013/0275808 A1 | 10/2013 | McNeeney et al. | |
| 2014/0089264 A1 | 3/2014 | Talagala et al. | |
| 2014/0223115 A1* | 8/2014 | Dinkjian ............... | G06F 3/0653 711/158 |
| 2015/0169449 A1 | 6/2015 | Barrell et al. | |
| 2015/0172120 A1 | 6/2015 | Dwarampudi et al. | |
| 2015/0341212 A1 | 11/2015 | Hsiao et al. | |
| 2015/0363245 A1 | 12/2015 | Mutschler | |
| 2016/0063080 A1 | 3/2016 | Nano et al. | |
| 2016/0210061 A1 | 7/2016 | Soncodi et al. | |
| 2016/0321287 A1 | 11/2016 | Luthra et al. | |
| 2016/0337435 A1 | 11/2016 | Nigam et al. | |
| 2016/0357476 A1* | 12/2016 | Chen .................... | G06F 3/0638 |
| 2017/0075832 A1 | 3/2017 | Bhimani et al. | |
| 2017/0075947 A1 | 3/2017 | Kurilov et al. | |
| 2017/0177263 A1* | 6/2017 | Das ....................... | G06F 3/0604 |
| 2017/0212891 A1 | 7/2017 | Pundir et al. | |
| 2018/0101842 A1* | 4/2018 | Ventura ................ | H04L 9/0841 |
| 2018/0121307 A1 | 5/2018 | Braun et al. | |
| 2018/0176244 A1 | 6/2018 | Gervais et al. | |
| 2018/0184138 A1 | 6/2018 | Shaw et al. | |
| 2018/0329644 A1* | 11/2018 | Das ....................... | G06F 3/067 |
| 2018/0332325 A1 | 11/2018 | Kaitchuck | |
| 2018/0332365 A1 | 11/2018 | Kaitchuck et al. | |
| 2018/0332366 A1 | 11/2018 | Paduroiu | |
| 2018/0332367 A1 | 11/2018 | Kaitchuck et al. | |
| 2018/0336256 A1 | 11/2018 | Li et al. | |
| 2018/0345140 A1 | 12/2018 | Posin | |
| 2019/0026301 A1 | 1/2019 | Wang et al. | |
| 2019/0138494 A1* | 5/2019 | Inoue .................... | G06F 9/30021 |
| 2019/0340180 A1 | 11/2019 | Barsness et al. | |
| 2019/0349422 A1 | 11/2019 | Dhruvakumar et al. | |
| 2020/0034468 A1 | 1/2020 | Lei et al. | |
| 2020/0174695 A1 | 6/2020 | Bazarsky et al. | |
| 2020/0250172 A1 | 8/2020 | Busjaeger et al. | |
| 2020/0320005 A1 | 10/2020 | Shulman et al. | |
| 2020/0344299 A1* | 10/2020 | Sohail .................. | G06F 16/27 |
| 2020/0394196 A1 | 12/2020 | Shivanna et al. | |
| 2020/0404011 A1 | 12/2020 | Gervais et al. | |
| 2021/0110328 A1 | 4/2021 | Hsiao et al. | |
| 2021/0124746 A1* | 4/2021 | Klaedtke ................ | G06F 7/14 |
| 2021/0256029 A1 | 8/2021 | Danilov et al. | |
| 2021/0342296 A1 | 11/2021 | Danilov et al. | |
| 2021/0342354 A1 | 11/2021 | Danilov et al. | |
| 2021/0365211 A1* | 11/2021 | Danilov ................ | G06F 9/50 |
| 2022/0035533 A1* | 2/2022 | Danilov ................ | G06F 3/0611 |

FOREIGN PATENT DOCUMENTS

| | | |
|---|---|---|
| CN | 104901958 | 9/2015 |
| CN | 105591926 | 5/2016 |
| GB | 2377038 | 12/2002 |
| WO | 2002101585 | 12/2002 |
| WO | 2009014993 | 1/2009 |
| WO | 2015191120 | 12/2015 |
| WO | 2018148149 | 8/2018 |

OTHER PUBLICATIONS

J. C. Lee, J. Vance and R. Lysecky, "Hardware-Based Event Stream Ordering for System-Level Observation Framework," in IEEE Embedded Systems Letters, vol. 6, No. 4, pp. 81-84, Dec. 2014, doi: 10.1109/LES.2014.2359154. (Year: 2014).*

T. Onishi, J. Michaelis and Y. Kanemasa, "Recovery-Conscious Adaptive Watermark Generation for Time-Order Event Stream Processing," 2020 IEEE/ACM Fifth International Conference on Internet-of-Things Design and Implementation (IoTDI), 2020, pp. 66-78, doi: 10.1109/IoTDI49375.2020.00014. (Year: 2020).*

Aloysius K. Mok, Honguk Woo and Chan-Gun Lee, "Probabilistic Timing Join over Uncertain Event Streams," 12th IEEE International Conference on Embedded and Real-Time Computing Systems and Applications (RTCSA'06), 2006, pp. 17-26, doi: 10.1109/RTCSA.2006.52. (Year: 2006).*

M. Liu, M. Li, D. Golovnya, E. A. Rundensteiner and K. Claypool, "Sequence Pattern Query Processing over Out-of-Order Event Streams," 2009 IEEE 25th International Conference on Data Engineering, 2009, pp. 784-795, doi: 10.1109/ICDE.2009.95. (Year: 2009).*

Notice of Allowance dated Jun. 28, 2021 for U.S. Appl. No. 16/884,647, 39 pages.

Office Action dated Jun. 29, 2021 for U.S. Appl. No. 16/881,556, 24 pages.

Notice of Allowance dated Aug. 4, 2021 for U.S. Appl. No. 17/200,652, 51 pages.

Akidau et al., "MillWheel: Fault-Tolerant Stream Processing at Internet Scale" Proceedings of the VLDB Endowment, vol. 6, No. 11, 2013, 12 pages.

Akidau et al., "The Dataflow Model: A Practical Approach to Balancing Correctness, Latency, and Cost in Massive-Scale, Unbounded,

(56) References Cited

OTHER PUBLICATIONS

Out-of-Order Data Processing" Proceedings of the VLDB Endowment, vol. 8, No. 12, 2015, 12 pages.

"Execution Model" [https://beam.apache.org/documentation/runtime/model/]. The Apache Software Foundation. Retrieved Aug. 26, 2020, 5 pages.

"Apache Beam Programming Guide" [https://beam.apache.org/documentation/programming-guide/]. The Apache Software Foundation. Retrieved Aug. 26, 2020, 69 pages.

"What is Apache Flink?—Applications" [https://flink.apache.org/flink-applications.html#building-blocks-for-streaming-applications]. The Apache Software Foundation. Copyright 2014-2019, retrieved Aug. 26, 2020, 7 pages.

"What is Apache Flink?—Architecture" [https://flink.apache.org/flink-architecture.html]. The Apache Software Foundation. Copyright 2014-2019, retrieved Aug. 26, 2020, 3 pages.

"Stateful Function—Event-driven Application on Apache Flink" [https://flink.apache.org/stateful-functions.html]. The Apache Software Foundation. Copyright 2014-2019, retrieved Aug. 26, 2020, 8 pages.

"What is Apache Flink?—Operations" [https://flink.apache.org/flink-operations.html]. The Apache Software Foundation. Copyright 2014-2019, retrieved Aug. 26, 2020, 3 pages.

"Use Cases" [https://flink.apache.org/usecases.html]. The Apache Software Foundation. Copyright 2014-2019, retrieved Aug. 26, 2020, 5 pages.

"Introduction" [http://kafka.apache.org/intro]. The Apache Software Foundation. Copyright 2017, retrieved Aug. 26, 2020, 6 pages.

"Apache Kafka Quickstart" [http://kafka.apache.org/quickstart]. The Apache Software Foundation. Copyright 2017, retrieved Aug. 26, 2020, 6 pages.

"Use Cases" [http://kafka.apache.org/uses]. The Apache Software Foundation. Retrieved Aug. 26, 2020, 3 pages.

"Architecture Overview" [pulsar.apache.org/docs/en/concepts-architecture-overview/]. The Apache Software Foundation. Copyright 2020, retrieved Aug. 26, 2020, 11 pages.

"Messaging" [pulsar.apache.org/docs/en/concepts-messaging/]. The Apache Software Foundation. Copyright 2020, retrieved Aug. 26, 2020, 32 pages.

"Pulsar Overview" [pulsar.apache.org/docs/en/concepts-overview/]. The Apache Software Foundation. Copyright 2020, retrieved Aug. 26, 2020, 2 pages.

Office Action dated Jan. 29, 2021 for U.S. Appl. No. 16/256,083, 42 pages.

Office Action dated Oct. 1, 2021 for U.S. Appl. No. 16/915,762, 57 pages.

Office Action dated Oct. 1, 2021 for U.S. Appl. No. 17/127,724, 41 pages.

Notice of Allowance dated Dec. 15, 2021 for U.S. Appl. No. 17/064,747, 54 pages.

Notice of Allowance dated Feb. 4, 2022 for U.S. Appl. No. 16/915,762, 57 pages.

Office Action dated Jan. 21, 2022 for U.S. Appl. No. 16/864,892, 26 pages.

Notice of Allowance dated Feb. 24, 2022 for U.S. Appl. No. 17/038,079, 55pgs.

Azhar et al., "Efficient selection of access control systems through multi criteria analytical hierarchy process", IEEE, doi: 10.1109/ICET.2012.6375419, 2012, pp. 1-8. (Year: 2012).

Rox et al., "Construction and Deconstruction of Hierarchical Event Streams with Multiple Hierarchical Layers", IEEE, doi: 10.1109/ECRTS.2008.13,2008, pp. 201-210. (Year: 2008).

Notice of Allowance dated Feb. 18, 2022 for U.S. Appl. No. 17/083,145, 70pgs.

Office Action dated Mar. 21, 2022 for U.S. Appl. No. 16/864,905, 125 pgs.

Edi Muskardin et al., " Implementation of Hashing Algorithms in Stream Mining", International Conference on Smart Systems and Technologies (SST), Oct. 2018 , pp. 233-238.

Office Action dated Apr. 20, 2022 for U.S. Appl. No. 16/944,094, 48 pages.

Office Action dated Apr. 12, 2022 for U.S. Appl. No. 17/038,102, 48 pages.

* cited by examiner

ORDERED EVENT STREAM MERGING

TECHNICAL FIELD

The disclosed subject matter relates to data storage and, more particularly, to merging ordered event streams of a stream data storage system.

BACKGROUND

Conventional data storage techniques can employ an event stream, e.g., storing data corresponding to stream events in a logical order. In a conventional system, an event stream can provide for storing a generally unbounded stream of events whereby a portion of the stored events can then be read out in the order they were stored. One use of data storage is in bulk data storage. In a conventional event stream storage system, merging of two streams of events can complicate reading out the events in a satisfactory order. Accordingly, techniques to merge event streams to provide satisfactory ordering of event reads can be desirable.

DETAILED DESCRIPTION

Figure 1:
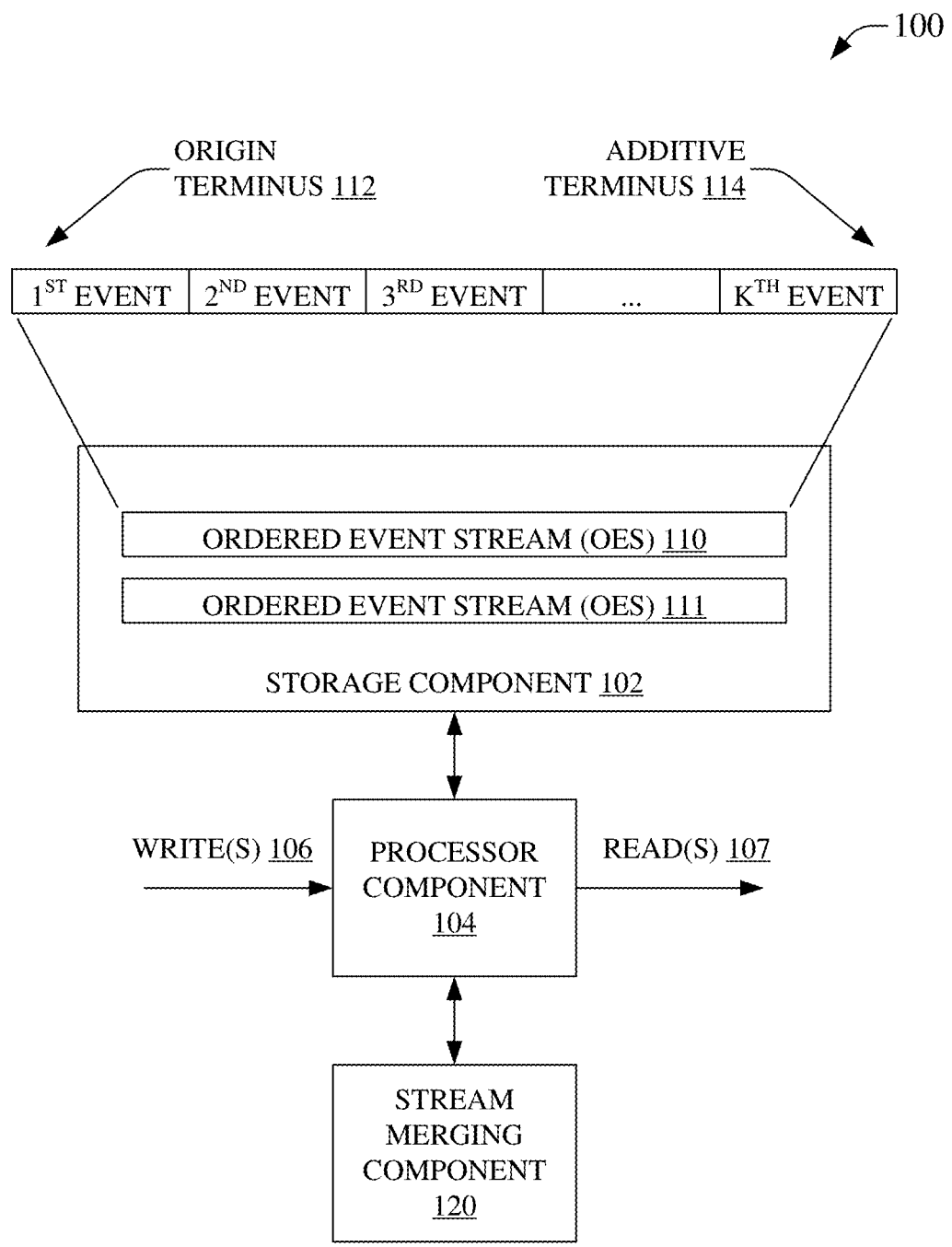
FIG. 1 is an illustration of an example system that can facilitate merging of segments of one or more ordered event streams, in accordance with aspects of the subject disclosure.

The subject disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

As mentioned, conventional event stream storage techniques, for example, can merge event streams in a manner that can complicate readout of events of a merged stream. The complications, for example, can arise from simply merging according to a time an event was stored. This can appear to be a simple task, but in application, merging according to a time an event was stored can cause additional computational demand, more especially where events can be stored according to different storage schemes, e.g., in different epochs, as is disclosed elsewhere herein. The use of different storage schemes for events of an ordered event stream (OES), e.g., an OES having different OES segment schemes as an OES advances can require reading out OES events according to those different storage schemes. As such, simply arranging merged events by time can result in an increase in storage scheme changes to read out a merged OES stream. Accordingly, it can be desirable to reduce the frequency of storage scheme changes while still providing reading of merged events that retain a modicum of correlation to a time, progress, etc., in which the events were written to one or more segments of one or more OES.

An OES storage scheme can correspond to a distribution of a hashed key space to segments of an OES. As an example, a first OES storage scheme can have a hashed key space extends from 0 to 1, wherein a first segment can store events having a hashed key value 'y' between 0 and 0.28, e.g., $0 \leq y < 0.28$, and a second segment of the OES can store events having 'y' between 0.28 and 1, e.g., $0.28 \leq y < 1$. The example first OES storage scheme can be altered to a next storage scheme, e.g., advanced to a second epoch, wherein the first and second segment can be closed and a third and fourth segment can be opened wherein third segment can store events having a hashed key value 'y' between 0 and 0.7, e.g., $0 \leq y < 0.7$, and the fourth segment of the OES can store events having 'y' between 0.7 and 1, e.g., $0.7 \leq y < 1$. Moreover, the second epoch can end when a third epoch is begun that represents a third OES storage scheme, for example, closing the third and fourth segments and opening fifth through seventh segments, wherein the fifth segment can store events having a hashed key value 'y' between 0 and 0.1, e.g., $0 \leq y \leq 0.1$, the sixth segment can store can store events having 'y' between 0.1 and 0.5, e.g., e.g., $0.1 \leq y < 0.5$, and the seventh segment can store can store events having 'y' between 0.5 and 1, e.g., $0.5 \leq y < 1$. It can be appreciated that the use of different storage schemes in OES streams, or segments thereof, can complicate simple time merging of events of one or more streams.

In an aspect, transitions between OES epochs, e.g., changing OES storage schemes can be related to changing write and read demands associated with a stream of data. As an example, writing ride share service events to an OES can be according to OES segments that can divide the hashed key space into regions, e.g., a west region, a central region, and an east region. In this example, as peak demand for ride share services can be associated with the time zones, for example being busier in the east zone at local 5 pm than in the west zone that is at local 2 pm. A such, there can be more demand, in this example, to write data to the OES segment corresponding to the east region and the storage scheme can meet this demand by scaling the OES segment to allow more east region data to be written, e.g., splitting the example OES segment to more segments to allow engaging more processors, which, in some embodiments, can increase the hashed key space related to the now plural OES segments for east region event writing. Moreover, as time continues, demand can increase in the west region and wane in the east region, for example 5 pm in the west can be 8 pm in the east. As such, the east region segments can be scaled down and the west region segments can be scaled up, e.g., effectively shifting processing power to storage of west region events rather than east region events. The change in scaling of the segments of the OES can be associated with a change in storage scheme that can be referred to as a change in OES storage epochs, for example see system 200, etc. The details on epoch changes are generally outside the scope if the instant disclosure but changes in OES storage schemes can be relevant to the instant disclosure in that these epoch changes can complicate merging of events from one or more segments of one or more OES streams, as is disclosed in more detail herein below, and that is not typically well managed in conventional stream storage technologies.

Generally, changes to an OES storage scheme, e.g., an epoch change, etc., can be in response to an indication that computing resources are becoming sufficiently burdened. In a conventional system, an event stream can typically be evenly bifurcated, e.g., each of the two resulting event stream portions can be about one half of the initial event stream in an attempt to divide the amount of computing resources used in the initial stream about evenly between the initial computing resources and newly added additional computing resources. As an example, if an initial event stream causes a load of two units of work for a first processor, the two units of work load are correspond to an even distribution of work across the associated key space of the initial event stream, and the two units of work exceed a threshold work level of the first processor, the stream can be split and a second processor can be added, such that the first processor now supports a second stream, in lieu of the initial stream, at about one unit of work and a third stream can be supported at about one unit of work by a the second processor, again, assuming the work load from the initial stream was distributed roughly evenly across the key space of the initial event stream. In an aspect, the presently disclosed subject matter can employ improved scaling of an event stream or portion thereof. An event stream, or a stream for convenience, can be a durable, elastic, append-only, unbounded sequence of so-called events. An example of an ordered event streaming storage platform can be STREAMING DATA PLATFORM (SDP) by DELL EMC. An event can be added to a head of a stream of events, e.g., a first event can be considered at a tail of the event stream and a most recent event can be regarded as at the head of the stream with other events ordered between the tail and the head of the stream. Every event of the stream can have a routing key, or simply key for convenience. A key can often be derived from data of the event, e.g., a "machine-id," "location," "device type," "customer number," "vehicle identifier," etc. As such, events with the same routing key can be consumed, e.g., read, in the order they were written.

A stream can be comprised of a set of portions, e.g., shards, partitions, pieces, etc., that can generally referred to as stream segments, or simply segments for convenience. The segments can act as logical containers for one or more events within a stream. When a new event is written to a stream, it can be stored to a segment of the stream based on a corresponding key. Event routing keys can be hashed to form a "key space". The key space can be employed to divide the stream into a number of parts, e.g., segments. In some embodiments, consistent hashing can be employed to assign events to appropriate segments. As an example, where a stream comprises only one segment, all events to be written to the stream are written to the same segment in an ordered manner and the segment corresponds to the entire key space. As another example, where a stream comprises two segments, the key space of the event, e.g., from zero to 'n', can be associated with the two segments, however each of the two segments can be associated with a portion of the total key space, for example, the first segment can store events with a key between zero and 'm' and the second segment can store events with a key between 'm+1' and 'n'. It will be appreciated that more segments can serve to further divide the key space such that a segment can store an event with a key falling within the range of the key space associated with that segment. As an example, a four segment event stream can have each segment store data for a quarter of the total key space, e.g., segment A can store events with keys from 0 to <0.25, segment B can store events with keys from 0.25 to <0.5, segment C can store events with keys from 0.5 to <0.75, and segment D can store events with keys from 0.75 to 1.0.

In an aspect, a segment of an event stream is generally associated with a single processing instance to assure ordering of the events stored in the segment. A processing instance can be a single real physical processor, a virtualized processor executing on one or more real physical processors, a group of real physical processors, a group pf virtual processors executing on one or more real physical processors, etc. As an example, a processing instance can be a blade server of a rack system. As another example, a processing instance can be a virtual processor deployed in an elastic computing system, e.g., a 'cloud server,' etc.

Typically the processing instance can be associated with a level of performance which, in some embodiments, can be measured via one or more key performance indicators (KPIs) for the processing instance. As an example, a first blade server of a rack can have a first level of performance and a second blade server of a rack can have a second level of performance. In this example, where the two blade servers can comprise similar hardware and environments, they can have similar levels of performance. However, also in this example, where the two blade servers comprise different hardware and/or are in different environments, they can have different, sometimes substantially different, levels of performance. As an example, a first processing instance can perform one unit of work, a second processing instance can perform one unit of work, a third processing instance can perform five units of work, a fourth processing instances can perform three units of work, etc., where the unit of work can correspond to a number of event stream operations that can be performed by the processing instances, e.g., reads, writes, etc. In this example, the first and second processing instances can perform similar amounts of work in an event stream storage system, while the third processing instance can be capable of up to five times the work of either the first or second processing instance. Generally, the computing resources of a processing instance can be associated with costs, e.g., monetary costs, electrical consumption costs, dispersion of generated heat costs, support costs, real estate for deployment costs, etc. As such, selecting an appropriate processing instance can be associated with optimizing cost. As an example, if an event stream always consumes less than one unit of work, then pairing the stream with a processing instance that can perform one unit of work can be a better use of computing resources, e.g., lower overall aggregate costs, etc., than pairing the even stream with a processing instance that can perform 200 units of work which can result in wasting up to 199 units of work through underutilization. Moreover, in this example, the 200 unit processing instance, for example, can be a newer high end processing instance that can have a high monetary cost, and generate more heat than the one unit processing instance that, for example, can be a low cost commodity processing instance that is plentiful, has a low monetary cost, and is already widely deployed. As such, paring the one unit of work event stream with a racecar of a performance instance can be understood as possibly not being an optimal pairing in comparison to a more pedestrian performance instance.

In an aspect, a segment can be scaled where a threshold performance occurs. As an example, an event stream segment can typically consume less than one unit of work, e.g., one unit of computing resources, and the stream segment can be associated with a processing instance that can perform up to one unit of work. However, in this example, where the segment increases demand to 1.5 units of work, the segment can be scaled, e.g., split into two daughter segments, such that each daughter segment can be associated with events for half of the key space of the parent segment before scaling. In this example, where the daughter segments are each associated with a processing instance that can perform one unit of work, and where the key space of the initial segment has a generally even distribution of work, then each daughter segment, for example, can be associate with about 0.75 units of work, e.g., the parent segment now consumes at 1.5 units, e.g., exceeding the capacity of the existing processing instance, and the parent segment can be split into two daughter segments at about 0.75 units each where each daughter segment can now consume less than the one unit of work available through their corresponding processing instances.

In an aspect, there can be additional processing, reassignment of reading instances that read events from the segment(s) of the stream, reassignment of writing instances that write events into the segment(s) of the stream, etc., effort and expense spooling up/down processing instances, etc. As such, scaling is generally not performed without impact on an event stream storage system. Returning to the above example, where the parent segment reached 80% of the one unit of work available through the corresponding processing instance, a benefit value of scaling the segment can be determined. Where the benefit value satisfies a scaling rule, the parent segment can then be scaled into the example daughter segments. The benefit value can be determined based on the expected performance of the daughter segments. As an example, if the parent segment reaches 80% consumption of computing resources, e.g., 80% work, then where the key space is evenly distributed, each daughter can be expected to inherit 40% consumption of the computing resources where each processing instance is generally capable of about one unit of work. This results in each processing instance consuming 40% less work and leaves sufficient available computing resources to allow for further increase in each of the daughter segments that could be difficult to manage if the parent segment is not scaled. This level of improvement and the resulting daughter segments being under the threshold 80% consumption of corresponding processing instance resources can be determined to satisfy the scaling rule and the segment can be scaled up. It is noted that the daughter segments can later be scaled down, e.g., combined into a single segment, combined with other segments, etc., for example, where the daughter segments begin to consume less that, for example, 20% of the available computing resources, they can be scaled down into one granddaughter segment that can consume 40% of a single processing instance. Further discussion of scaling down is generally not discussed herein for clarity and brevity, however it is expressly noted that scaling down is fully supported by the disclosed subject matter and is accordingly within the scope of the instant disclosure. In an aspect, distribution of events in a key space can be non-uniform. As an example, if an event stream has one segment that begins to consume 0.9 units of computing resources and is supported by a processing instance that can provide one unit of work with a scaling threshold value of 0.8 units, scaling can result in two daughter segments that each can consume 0.45 units of work where the work is generally evenly distributed across the key space of the parent segment, e.g., as is illustrated in an above example. However, where the distribution of work is non-uniform across the key space of the segment, for example where 0.8 units of the demand occurs in the lower half of the key space for the parent stream and only 0.1 units occurs in the upper half of the key space, then dividing the key space into daughters through symmetrical scaling, e.g., one taking the bottom half and one taking the top half of the key space, can result in one daughter segment having 0.8 units of demand and the other daughter segment having 0.1 units of demand. The daughter having 0.8 units of demand can already be ready for further scaling where the scaling threshold is 0.8 units. Use of asymmetric scaling can result in a more equitable scaling, e.g., the first daughter can inherit a portion of the parent key space having a work demand similar to the work demand from the balance of the parent key space. As such, the key space can be assigned to the daughter segments asymmetrically to enable balancing of work demanded by the resulting daughter segments.

In an aspect, merging of streams can be associated with reading out events according to storage schemes corresponding to the events of the merged stream. As such, merging a first and second OES using different storage schemes can result in switching back and forth between the two example storage schemes to read out events of the merged stream. As an example, a resulting merged stream can comprise a first event of the stream followed by a second event of the second stream followed by a third event of the first stream, etc. Reading this example merged stream out would then comprise reading the first event according to a first scheme, switching schemes to a second scheme to read the second event, then returning to the first scheme to read the third event. It can readily be appreciated that where the example first to third events occur near in time, then reordering the merged events can conserve computational power associated with changing of storage schemes during readout. As an example, the first and third events of the above example can be merged and followed by the second event in a merged stream according to the presently disclosed subject matter. This can result in reading out the first and third event according to the first scheme, then switching to the second scheme to read the second event from the merged stream. It immediately becomes apparent that an entire scheme transition is avoided by merging the streams in this manner, which can thereby improve the speed of the storage system, lower processing demand, etc.

While the above benefits are readily understood, it can be detrimental to group too many events together where it can erode a level of correlation between the progress of the stream and the events being grouped. As an example, where the first and third events of the above example occur at substantially different progress points, then grouping them together for reading before reading out the second event, even though it can improve the system itself in terms of processing power, efficiency, etc., can lead to decoupling of the ordering of the stream with the progress associated with the written data. As an example, if the first event and the second event occur five minutes apart and the third event occurs some fifteen hours later, then reading the first and third event covers more than fifteen hours of progress before reading out the second event that occurred a mere five minutes after the first event, e.g., the ordering of the merged stream of events can become increasingly less meaningful where merging to reduce schemes changes is not well bounded.

To better preserve ordering, while also improving schemes transition occurrences, events from segments and/or ordered event streams can be parsed according to one or more selection criteria prior to merging. This can result in a merged stream of events that retains meaningful ordering and also reduces persistent changes in storage schemes during readout. Again returning to the above example, a selection criteria can indicate that events should not be selected that are written, for example, more than ten minutes apart. In this example, where the third event is written fifteen hours after the first event, it would not be selected, e.g., via a pseudo-epoch as is disclosed elsewhere herein, and the resulting merged OES can comprise the first event then the second event, then the third event, albeit also committing to the associated changes in storage schemes when reading out those events. However, where in the above example the third event was written at seven minutes after the first event, rather than fifteen hours later, then the resulting merged stream can have the first event, then the third event, then the second event, which can reduce the burden of storage schemes shifting while also reflecting that the first and third events were written within ten minutes of each other and thereby preserving the meaningfulness of the order of the merged stream. Additional benefits can become more apparent when pseudo-epochs, hereinafter 'p-epochs', are applied across different streams that can each also comprise different segments and different epochs. These additional benefits are disclosed in more detail herein below.

To the accomplishment of the foregoing and related ends, the disclosed subject matter, then, comprises one or more of the features hereinafter more fully described. The following description and the annexed drawings set forth in detail certain illustrative aspects of the subject matter. However, these aspects are indicative of but a few of the various ways in which the principles of the subject matter can be employed. Other aspects, advantages, and novel features of the disclosed subject matter will become apparent from the following detailed description when considered in conjunction with the provided drawings.

FIG. 1 is an illustration of a system 100, which can facilitate merging of segments of one or more ordered event streams, in accordance with aspects of the subject disclosure. System 100 can comprise a storage component 102 that can store an ordered event stream (OES) 110, 111, etc. OES 110, 111, etc., can store one or more events. An event can be associated with a key, e.g., a routing key. A key can typically be determined from aspects of the corresponding event, although other key determination techniques can be employed. As an example, a key can be based on a characteristic of the source of the event data, such as a customer identifier, machine identifier, a location of a device providing the event data, a type of a device providing the event data, etc. Events with a same key can be written into OES 110, 111, etc., in an ordered manner. Similarly, events with a same key can be read from OES 110, 111, etc., in an ordered manner, e.g., in the order they were previously written into OES 110, 111, etc. Components providing events to be written can be termed 'writers' and components requesting events can be termed 'readers'. As such, a writer can provide an event that can be written to OES 110, 111, etc., in an ordered manner based on a key associated with the event. Similarly, a reader can receive an event from OES 110, 111, etc., based on a key.

Processor component 104 of a system 100 can receive write(s) 106 that can be written to OES 110, 111, etc., stored on storage component 102. Processor component 104 of a system 100 can provide access to events based on a key, e.g., as read(s) 107 that can be communicated to a reader. Generally, one processing instance, e.g., processor component 104, etc., is designated for writing events to a portion, e.g., segment, of OES 110, 111, etc. OES 110, 111, etc., can comprise one segment and/or parallel segments, e.g., stream segments, see FIG. 2, etc., that can store events according to a key. In an aspect, more than one processing instance writing to a segment of an OES is typically disfavored because it can increase the difficulty of writing incoming events in an ordered manner. However, a given processing instance can read/write to more than one OES segment, e.g., a given processing instance can write to one or more OESs, to one or more segments of one OES, to one or more segments of one or more OESs, etc. As such, for a given number of segments there can typically be up to the same number of processing instances. Although adding more processing instances is allowable, these additional processing instances are generally idle to avoid scrambling an order of events being written to a segment. It is further noted that system 100 can comprise idle processing instances, for example as reserve processing instances for failover where an active processing instance becomes less responsive, etc. In an aspect, keys of one or more segments of an OES can represent a key space for OES 110, 111, etc., see FIG. 2, etc. Segments can therefore act as logical containers associated with a particular range of keys for an event stream and can be used to store events within an OES. When a new event is written to a stream, it can be stored to one of the segments based on the event key. In an aspect, the key space can be divided into a number of ranges that can correspond to the number of segments of comprising an OES. As an example, a key space for an OES can be from 0 to 100, the OES can comprise two parallel segments wherein the first segment sequentially stores events with, for example, keys from 0 to 30 and the second segment sequentially stores events with keys from >30 to 100. In this example, a first event with a key of 54 can be appended to the second segment, a second event with a key of 29 can be appended to the first segment, a third event with a key of 14 can be further appended to the second event in the first segment, etc.

OES 110, 111, etc., as illustrated in system 100, can be a simplistic example of an OES that can comprise just one segment for storing incoming event write(s) 106 and sourcing event read(s) 107, and therefore the key space of OES 110, 111, etc., can be embodied in the example single segment of events, e.g., the key space of OES 110 is not illustrated as being distributed across more than one parallel event storage segment. As an example, OES 110 can have an origin terminus 112. A first event can be written at origin terminus 112. The subsequent events can then be appended at an additive terminus 114 that is typically always at the head of the stream of written ordered events, e.g., a most recent event is written to the head of example OES 110, which can provide ordering of the events being written. This can result in example OES 110 allowing for continuous and unbounded data storage that can be a durable, elastic, append-only, unbounded sequence of events. As an example, a $(K+1)^{th}$ event can be appended to the $K^{th}$ event of example OES 110 at additive terminus 114. In an aspect, storage component 102 can store any number of OESs, e.g., OES 110, 111, etc. Moreover, any one OES can comprise any number of parallel segments, e.g., stings of events for a defined key space range. Each segment can comprise an ordered sequence of stored events.

In system 100, stream topology component 120 can facilitate adapting a topology of one or more OESs. In an aspect, the adapting of the topology can comprise scaling of OES 110. Scaling can comprise 'scaling up,' e.g., increasing a count of parallel segments of OES 110, 'scaling down,' e.g., decreasing a count of parallel segments of OES 110, etc. Moreover, OESs, or portions thereof, can be merged, e.g., can be allowed to be read out in a manner that merges the ordering of the written OES events. As an example, OES 110 and OES 111 can be merged such that reading out the merge can comprise reading out the events of each of OES 110 and 111 in an ordered sequence related to the order in which the events were written to each of OES 110 and 111. Where, for example, OES 110 has an event at progress point 1 and 5 and OES has an event at progress point 3, then reading out a merged OES comprising OES 110 and 111 can read out the event at progress point 1, then 3, then 5, etc. As such, the merger of OES 110 and 111 preserves the order in which the events were written in the example two streams. In an aspect, more than two streams can be merged. Moreover, segments of streams can also be merged. As an example, OES 110 can comprise two stream segments wherein the first segment has events at progress points 1, 3, and 5, the second segment has events at 4 and 8, and OES 111 can comprise one stream having events at 2 and 7, such that the readout of the merged streams can read out the events at 1, then 2, then 3, then 4, then 5, then 7, then 8, etc. Similarly, in this example, merging of the segments of example OES 110 can result in reading out event 1, then 3, then 4, then 5, then 8, etc.

Merging of OESs, or portions thereof, can be supported by stream merging component 120 that can facilitate ordered reading of OESs, or portions thereof. In an aspect, merging can comprise reading out events in a 'merged order' that doesn't alter the storage locations of the events in storage component 102. In an aspect, the order of the merged events can be determined by stream merging component 120 and, in some embodiments can be stored so that the merged OES can be read out at a later time. Furthermore, in an aspect, the locations of the stored events can be altered, e.g., events can be rewritten in a particular order corresponding to the resulting merged OES. As an example, the events of a first and second OES can be rewritten to different storage locations in an order so that future reads of the resulting merged OES can read from a more compact set of storage locations rather than seeking event storage locations across more scattered storage locations of storage component 102, e.g., writing events in order in a block of storage memory can allow for more efficient reads of the merged stream in comparison to seeking events stored in many different blocks of the storage memory because there can be less time spent seeking each individual location in contrast to finding the start of the block and reading though many sequentially stored events in the same block. In an aspect, this aspect can be increasingly important when some portions of a stream are moved to a different type of storage, e.g., from fast local storage to slower archival storage, from RAM to disk, etc.

As an example, where an OES stream holds a last 100 events in a fast access storage device and offloads older events to a slower access storage device, accessing the last 250 events can comprise reading 150 events from the slower access storage device, then reading 100 events from the fast access storage device. In this example, merging two OESs that comprise 250 and 300 events correspondingly, can result in reading 450 events from slower access storage devices, wherein ordering the storage locations to place the merged stream in more contiguous blocks can provide additional benefit to increasing access time to those events. However, even where the events are not relocated in the merging, they can still be read out in an order via seeking the relevant events among the different storage locations, types, etc.

Figure 2:
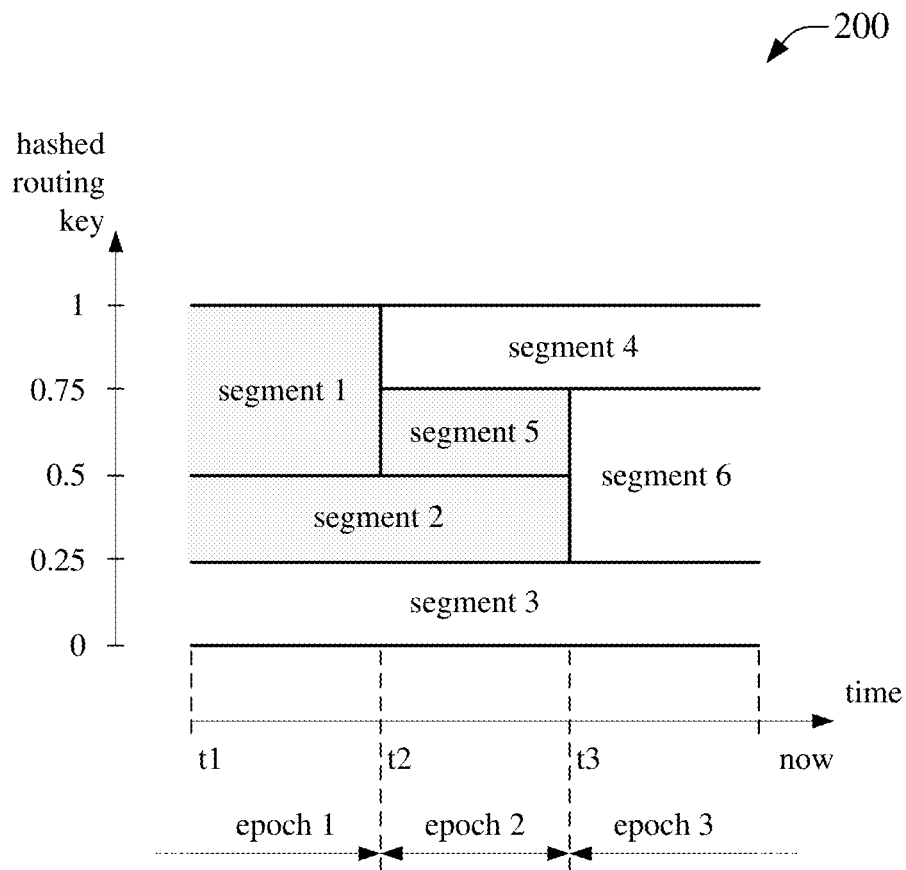
FIG. 2 is an illustration of an example scaling of an ordered event stream that can be subject to merging, in accordance with aspects of the subject disclosure.

In an aspect, merging streams comprising segments can comprise accessing events according to a storage scheme that can change in conjunction with changes to a key space associated with a segment, e.g., epoch changes as shown in FIG. 2, etc. Accordingly, this can increase the complexity of balancing strict event ordering and computational complexity with accessing an event. It can be understood that accessing a plurality of events with fewer schemes/epoch changes can be more efficient, e.g., grouping events having the same storage scheme can reduce the number of schemes changes when reading out events from more than one epoch. However, this can compromise the strict ordering of the events. As an example, a first OES having a first storage scheme can store an event at time 1, 3, and 5, while a second OES having a second storage scheme can store events at time 2, 4, and 6, such that strict ordering would read out the events from time 1 to 6 but would require a storage schemes change between reading each of the six events. In contrast, in this example, grouping the events of the first scheme together and the events of the second scheme together can allow for reading with less strict ordering but with fewer scheme transitions, e.g., reading 1, 3, 5, 2, 4, 6 with a schemes transition between reading event 5 and event 2. Where these six events occur sufficiently close in time, this less strict ordering can be an acceptable tradeoff to reduce the computational complexity of the readout of the merged OES stream. However, where the less strict ordering is problematic, this tradeoff can be less acceptable.

In an aspect, constraints on the loss of ordering can be implemented. As an example, where a first OES using a first storage scheme has events at 1, 3, and 200, and a second OES using a second storage scheme has events at 2, 100, and 199, then a constraint allowing grouping of events under 5 units of progress apart can result in reading out event 1, then 3, then transitioning to the second storage scheme to read out 2, then 100, then 199, then transitioning back to the first storage scheme to read out event 200, e.g., grouping events 1 and 3 with a small loss in the fidelity of the event ordering that is less than the prescribed 5 units of progress. In contrast, where the constraint is 300 units of progress, then the readout can be 1, 3, and 200, then transitioning to the second storage scheme and reading out 2, 100, and 199. These two examples can be compared to preservice strict order, e.g., the constraint is set to 1 unit of progress or less, where the reads would be 1, then transitioning to the second scheme to read 2, then transitioning back to the first scheme to read 3, then again transitioning to the second scheme to read 100 and 199, then again transitioning back to the first scheme to read the event at 200. As such, a selectable constraint on the strictness of ordering can offer advantages in storage system performance, e.g., reducing storage schemes transitions and the associated computational complexity can increase system speed, efficiency, reduce a count of computational cycles needed to access data, can reduce power consumption, can reduce the complexity of the computing hardware/software needed, e.g., less computational load can allow for use of less expensive and/or fewer processors, etc., and other readily appreciated benefits.

FIG. 2 is an illustration of an example scaling of an ordered event stream 200 that can undergo merging operations, in accordance with aspects of the subject disclosure. Ordered event stream 200 can comprise segments. OES events can be stored at progress points, for example, time, count, or some other progress metric, e.g., at a number of revolutions, at a time of day, per occurrence of a transaction, etc. Generally, for the sake of simplicity, progress is typically discussed in terms of time in the instant disclosure. However other progress types are expressly within the scope of the instant disclosure and can be readily employed in almost any aspect disclosed herein. At a first progress point, for example t1, OES 200 can comprise one or more parallel segments, e.g., segment 1, segment 2, segment 3, etc. At some point a segment can be scaled. As an example, at t2, segment 1 can be scaled up. This can result in causing segment 4 and segment 5 and correspondingly sealing segment 1. The topology of the OES comprising segments 1-3 pre-scaling can be designated as epoch 1. Similarly, the topology of the OES comprising segments 4-5 and 2-3 can be designated as epoch 2.

In an aspect, segments 2 and 3 can be contiguous across epochs 1 and 2, while segment 1 can end at the transition from epoch 1 to 2. In an aspect, in epoch 1, events associated with a key between 0.5 and 1, e.g., $0.5 \leq key < 1$, can be written (and read from) segment 1, while in epoch 2, events associated with a key between 0.75 and 1, e.g., $0.75 \leq key < 1.0$, can be written (and read from) segment 4 and events associated with a key between 0.5 and 0.75, e.g., $0.5 \leq key < 0.75$, can be written (and read from) segment 5. As such, access to events for a given key can be associated with reads in different epochs. As an example, reading an event with a key of 0.8 can read from both segment 1 and segment 4. Where a read is performed from head to tail, the read of example events with a key of 0.8 can begin reading in segment 4 and then continue reading into segment 1 across the epoch boundary between epoch 2 and 1, albeit with different corresponding storage schemes. Similarly, where the read can be from tail to head, events associated with the example key of 0.8 can begin in segment 1 and continue into segment 4 across the epoch boundary. However, it is noted that generally no additional events are written into segment 1 after a new epoch is begun.

In epoch 2, the topology of OES 200 can comprise segments 4-5 and 2-3. At some point further scaling can be undertaken, e.g., at t3. OES 200 can, for example, scale down by condensing segment 2 and 5 into segment 6 beginning at t3. This example scaling down can reduce a count of segments comprising OES 200. The scaling at t3 can result in ending epoch 2 and beginning epoch 3. The example scaling can cause segment 6 to be opened and can comprise closing segments 2 and 5. As such, in epoch 3, the topology of the OES comprising segments 3-4 and 6, post-scaling, can distribute the key space of OES 200, for example, as $0 \leq segment\ 3 < 0.25$, $0.25 \leq segment\ 6 < 0.75$, and $0.75 \leq segment\ 4 < 1.0$.

Figure 3:
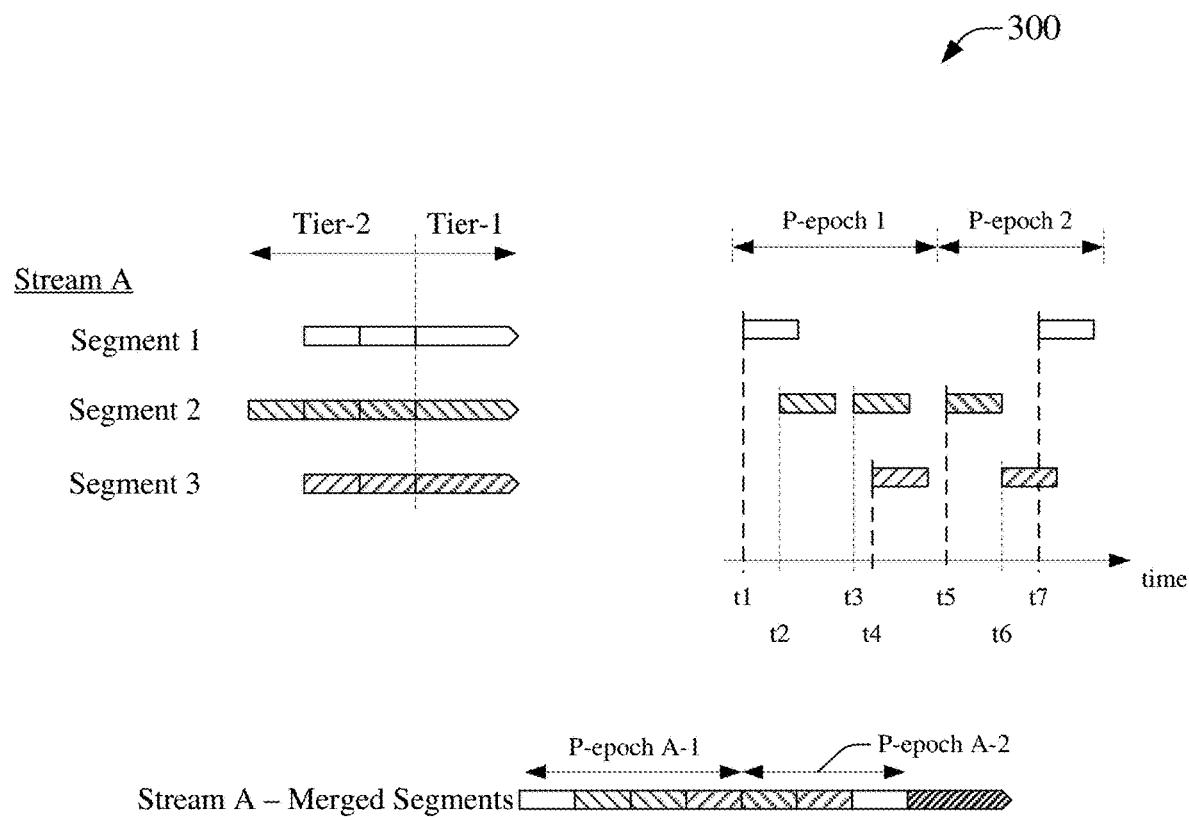
FIG. 3 illustrates an example system that can enable merging of segments of an ordered event stream, in accordance with aspects of the subject disclosure.

FIG. 3 is an illustration of a system 300, which can support a merging operation for segments of an ordered event stream, in accordance with aspects of the subject disclosure. System 300 can comprise Stream A that can comprise segments, e.g., Segment 1 to Segment 3. In an aspect, the events of the segments of the OES can be stored in one or more types of storage, e.g., Tier-1 and Tier-2 storage types, such as a local disk providing fast read access of events and a remote disk providing lower cost storage of events but having slower read access times, etc. Moreover, the events of the segments of the OES can span different epochs, e.g., can have been written under different storage schemes. In an aspect, the information corresponding to the writing of an event can be employed in determining a pseudo-epoch, hereinafter 'p-epoch', for example P-epoch 1 and P-epoch 2. A pseudo-epoch can encompass a constrained number of events. In an aspect, a pseudo-epoch typically does not comprise events from two epochs. In some embodiments, a pseudo-epoch can have a defined maximum progress window, e.g., a designated maximum time window, etc. As a first example, an epoch can extend from t1 to t10, and a defined maximum time window of four time units. In this first example, a first p-epoch can comprise events from t1 up to t5, a second p-epoch can comprise events from t5 to up to t9, and a third p-epoch can comprise events from t9 through t10. Further in this first example, all p-epochs comprise events under the same storage scheme, e.g., all are stored in the first epoch. As a second example, an epoch can again extend from t1 through t10, and a defined maximum time window of four time units can again be indicated. In this second example, a first p-epoch can comprise events from t1 up to t3, a second p-epoch can comprise events from t3 to up to t7, and a third p-epoch can comprise events from t7 through t10. Again, all p-epochs can comprise events under the same storage scheme. Additionally, it can be noted that a p-epoch, e.g., the first p-epoch, can comprise events from less than the maximal progress window. As a third example, a first epoch can extend from t1 up to t6, a second epoch can extend from t6 up to t10, and a defined maximum time window of four time units can be designated. In this third example, a first p-epoch can comprise events from t1 up to t5, a second p-epoch can comprise events from t5, and a third p-epoch can comprise events from t6 through t9. In this third example, the first and second p-epochs comprise events under a first storage scheme while the third p-epoch can be according to a second storage scheme, e.g., the first and second p-epochs can comprise events from the first epoch while the third p-epoch can comprise events from the second epoch.

In system 300, the segments can be merged, e.g., a Stream A—Merger Segments. In an aspect, a p-epoch can be determined, for example in system 300, by selecting an oldest data chunk comprising an event, hereinafter a 'chunk', that is not already part of another p-epoch, from each segment of a stream, e.g., from each of Segments 1 to 3 from Stream A. A minimal and maximal progress value, e.g., a progress step, can then be determined for the selected chunks. All chunks of the involved segments within the progress step can then be selected and merged into a pseudo-epoch. As is noted elsewhere herein, in an aspect, merging can comprise determining a read order, can comprise rewriting the events in a determined order, etc., to facilitate efficient reading of the events of the chunks of the p-epoch. In system 300, a chunk comprising an event in Segment 1 can be written at t1, and this chunk can be free, e.g., not already part of a p-epoch. Similarly, chunks of Segment 2, for example, can be at t2 and t3. Moreover, a chunk of Segment 3 can be at t4. Accordingly, in this example, chunks an t1, t2, and t4 can be selected. The progress step can then be determined to extend from t1 up to, but not including t5, e.g., $t1 \leq progress\ step < t5$. The chunks at t1, t2, t3, and t4 can then be selected because they are within the progress step. These chunks can then be merged, as is illustrated in Stream A—Merged Segments under P-epoch A-1. This example can then be iterated, wherein the first free chunk can be at t5 from Segment 2, and the last chunk can be at t7 from Segment 1, whereby the next progress stem can be from t5 thorough t7, such that the chunks at t5, t6, and t7 can be selected and merged, as is demonstrated at Stream A—Merged Segments under P-epoch A-2. Newer chunks comprising events after t7 can be then appended to the head of Stream A—Merged Segments, e.g., as the dark forward hashed portion extending to the right. This can enable merging of segments of a stream. In this example, the progress step can satisfy a first rule corresponding to a maximum progress window and can also satisfy a second rule related to avoiding inclusion of events stored in different epochs. As such, in a first embodiment, P-epoch 1 can and P-epoch 2 can comprise events from the same epoch. In a second embodiment, P-epoch 1 can comprise events from a first epoch and P-epoch 2 can comprise events from a second epoch. However, in both the first and second embodiments, neither P-epoch 1, nor P-epoch 2, can typically comprise events from different epochs, nor can the progress step exceed a maximum progress window.

Figure 4:
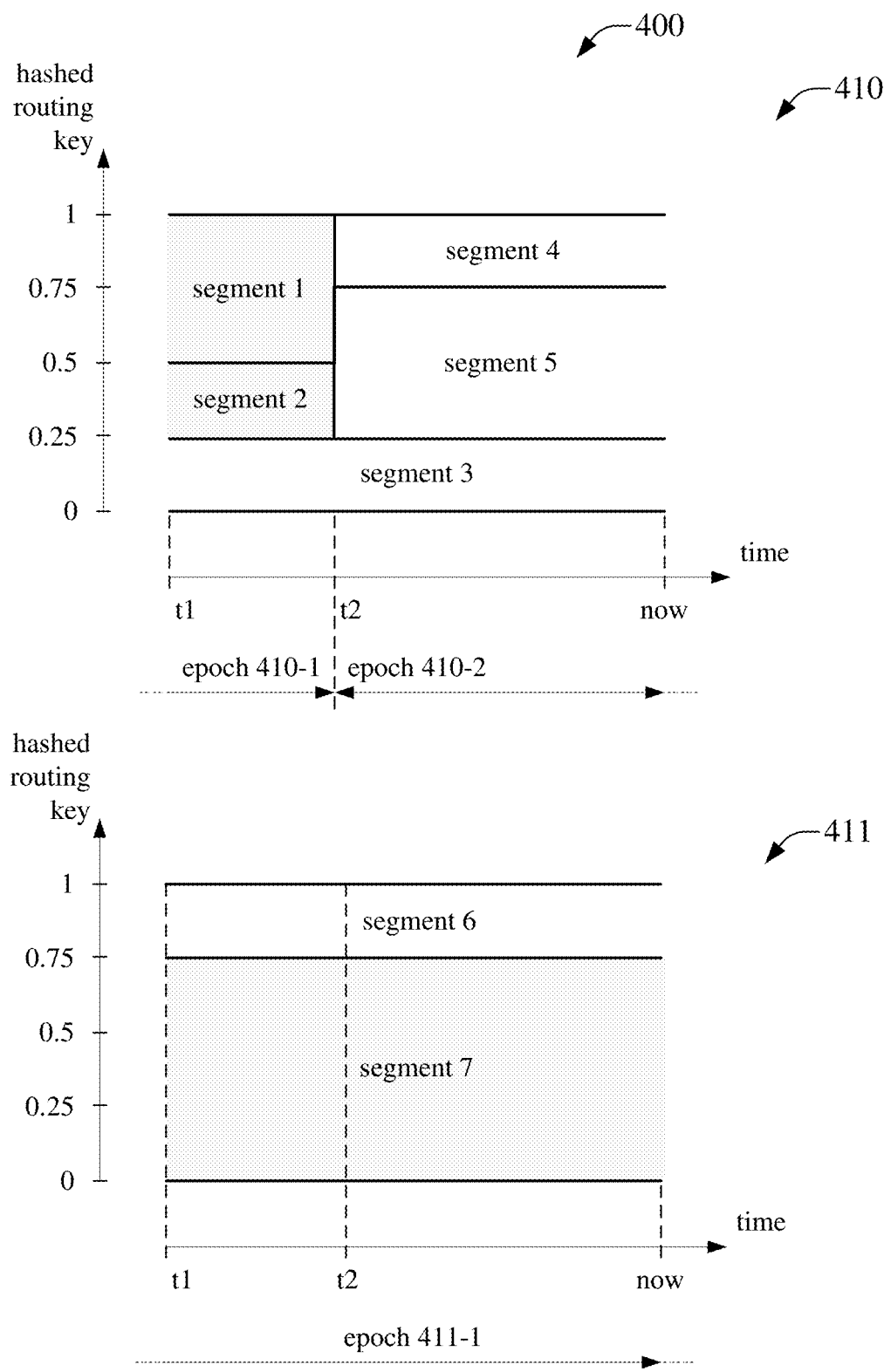
FIG. 4 is an illustration of an example scaling of at least one of a plurality of ordered event streams that can be subject to merging, in accordance with aspects of the subject disclosure.

FIG. 4 is an illustration of an example scaling 400 of at least one of a plurality of ordered event streams, e.g., 410 and 411, that can be subject to merging, in accordance with aspects of the subject disclosure. System 400 can comprise one or more storage components, e.g., for example, storage component 102, etc., storing events of OES 410 and OES 411 according to the illustrated storage schemes. Ordered event streams 410 and 411 can each comprise one or more segments in one or more epochs. As an example, OES 410, at t1, can comprise one or more parallel segments, e.g., segment 1, segment 2, segment 3, etc. As another example, OES 411 can comprise segments 6 and 7 at all illustrated times. At some point a segment can be scaled, such as for example, at t2, segments 1 and 2 can be closed and segments 4 and 5 can be opened such that the segments 4 and 5 cover a total key space that can be the same as segments 1 and 2 but can have a different proportion of coverage as is illustrated. The topology of OES 410 from t1 up to t2 can be designated as epoch 410-1, and from t2 on as epoch 410-2. Similarly, the topology of OES 411 from t1 to now can be designated as epoch 411-1.

In an aspect, segments of OES 410 can be merged as is disclosed elsewhere herein. Similarly, segments of OES 411 can be merged. Merging of segments of an OES, e.g., OES 410, 411, etc., can be subject to one or more rules relating to a selectable progress step, a determinable progress step, a maximum progress window, avoiding merging of events in two different epochs, etc. In regard to OES 411, where there are no illustrated epoch changes, the storage of events can all be according to a same storage scheme. As such, even where events can be in different types of storage, e.g., faster access, slower access, etc., the events are subject to the storage scheme corresponding to epoch 411-1. Accordingly, pseudo-epochs can serve to logically divide events of this epoch into more compact progress windows which can facilitate merging, according to the more compact progress windows, events that can be considered close in progress. As an example, if there are 100 evenly spaced events in segment 6 and 200 evenly spaced events in segment 7 between t1 and now, then merging of the two segments can result in merging events from segment 6 and segment 7 at a 1:2 ratio, e.g., for each event of segment of segment 6 selected, two events of segment 7 can be selected for merging before advancing to a next event of segments 6 and 7. Moreover, in this example, a maximum progress window can limit the number of events in the progress step, e.g., if the maximum progress window is determined to be 9 progress units, then three events of segment 6 and six events of segment 7 can be merged in an iteration of an event selection process. In an aspect, this can avoid trying to merge all 100 example events of segment 6 with all 200 example events of segment 7 by first reading out all 100 events of segment 6 followed by reading all two hundred events of segment 7, which can be appreciated as possibly not well preserving the ordering of the events. Rather, in the above example, three events from segment 6 can be read, followed by six events from segment 7, then returning to read three more events of segment 6, and so on, until all of the events are read out, which more closely preserves the ordering of the events of the two stream segments involved.

Similarly, in OES 410, merging of two or more of the three example segments can result in merging events by pseudo-epochs that do not exceed a maximum progress window, do not merge events across an epoch boundary, e.g., a first event from epoch 410-1 and a second event from epoch 410-2 are typically not merged because they employ different storage schemes that can complicate access to the event data by necessitating altering the reading scheme between the events of the different epochs. As an example, one or more pseudo-epochs can be determined for events within epoch 410-1 for segment 1 and segment 3, such that these segments can be merged according to the determined pseudo-epochs. Moreover, in this example, additional pseudo-epochs can be determined for events of segment 4 and segment 3 from t2 onward, e.g., in epoch 410-2, such that these events can also be merged accordingly. In this example, events having a key space hash value of 0.8 can then be read according to the determined pseudo-epochs merged with events having a key space hash value of 0.2 according to a first storage scheme for events written in epoch 410-1, e.g., from segment 1 and segment 3, and according to a second storage scheme for events written in epoch 410-2, e.g., from segment 3 and segment 4.

Furthermore, one or more events of one or more segments of a first OES, e.g., OES 410, can be merged with one or more events of one or more segments of a second OES, e.g., OES 411, etc. As an example, events stored according to epoch 410-1 of a segment of OES 410 can be merged with other events stored according to epoch 411-1 of a segment of OES 411. In an aspect, there is no theoretical limit to the number of segments and/or number of streams that can be merged in this manner, however, at some point, a massive merger begins to resemble a single giant stream that can be representative of the cumbersomeness that the use of multiple streams and segments attempts to avoid. For ease of illustration, it can be assumed hereinafter that all of segments 1 to 7 can be merged without issue.

Figure 5:
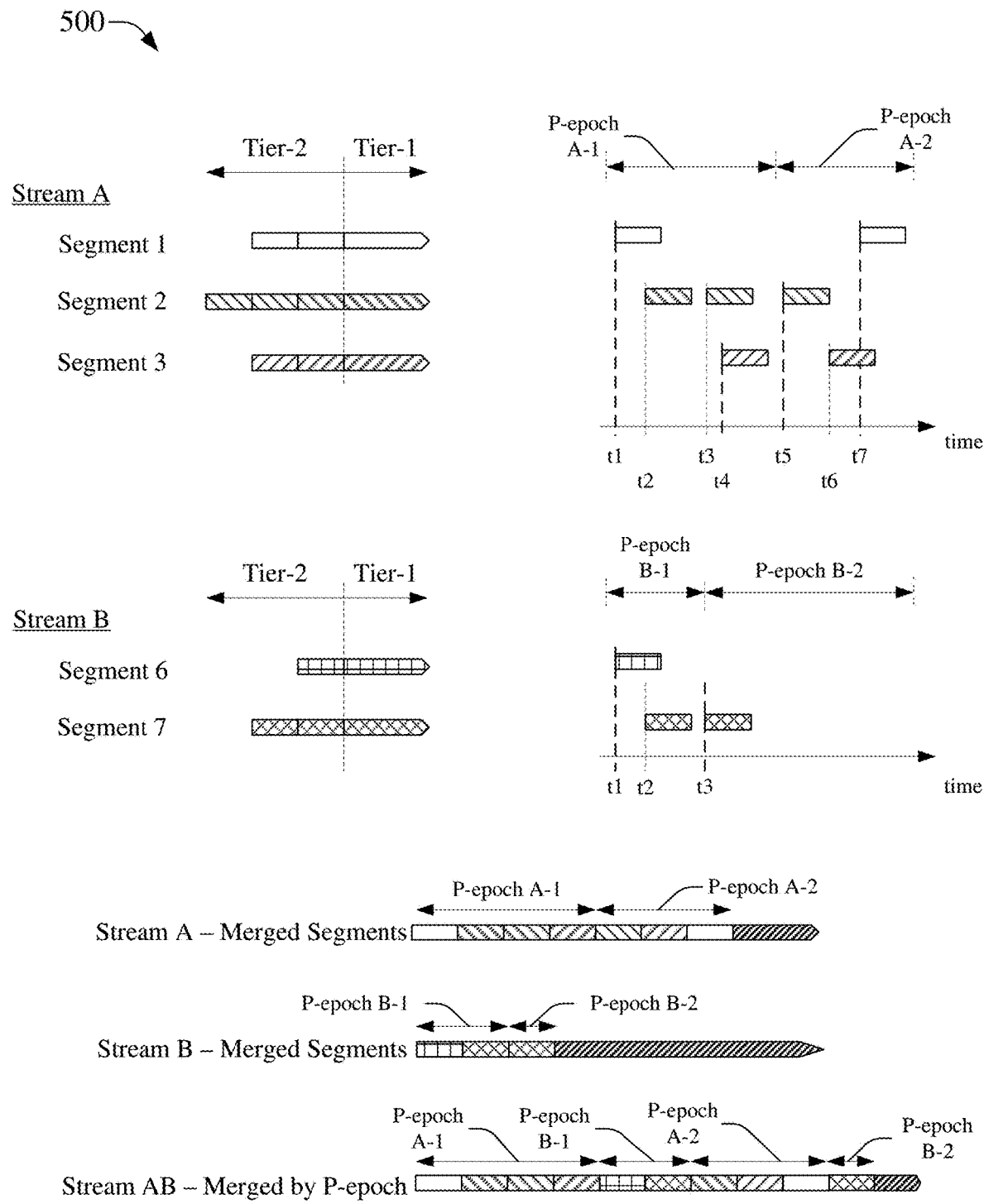
FIG. 5 is an illustration of an example system that can facilitate merging of segments between ordered event streams, in accordance with aspects of the subject disclosure.

FIG. 5 is an illustration of a system 500, which can facilitate merging of segments between ordered event streams, in accordance with aspects of the subject disclosure. System 500 can comprise Streams A and B that can comprise segments, e.g., Segment 1 to Segment 7, as illustrated. In an aspect, the events of the segments of the OESs can be stored in one or more types of storage, e.g., Tier-1, Tier-2, etc., storage types. Moreover, the events of the segments of the OESs can span different epochs, see for example, FIGS. 2, 4, etc. As such, information corresponding to the writing of an event in a segment of an OES can be employed in determining a pseudo-epoch, for example P-epoch A-1, A-2, B-1, B-2, etc. A pseudo-epoch can encompass a constrained number of events, e.g., events occurring between two progress points, etc. In an aspect, a pseudo-epoch, as is noted herein before, typically does not comprise events from two epochs, which can avoid needing to employ different storage schemes to read events within a pseudo-epoch. In some embodiments, a pseudo-epoch can have a defined maximum progress window, e.g., a designated maximum time window, etc.

In system 500, the segments can be merged between OESs, e.g., as Stream AB—Merged by P-epoch. As is noted elsewhere herein, segments within an OES can also be merged, e.g., as Stream A—Merged Segments, Stream B—Merged Segments, etc. In an aspect, a p-epoch can be determined, for example in system 500, by selecting an oldest data chunk that is not already part of another p-epoch from each segment of a stream, e.g., from each of Segments 1 to 3 from Stream A, from each of Segments 6 and 7 of Stream B, etc. A minimal and maximal progress value, e.g., a progress step, can then be determined for the selected chunks. All chunks of the involved segments within the progress step can then be selected and merged within a pseudo-epoch. As examples, one chunk from Segment 1, two chunks from Segment 2, and one chunk from Segment 3 can be merged within P-epoch A1; one chunk from Segment 6 and one chunk from Segment 7 can be merged within P-epoch B-1; etc. Again, as is noted elsewhere herein, in an aspect, merging can comprise determining a read order, can comprise rewriting the events in a determined order, etc., to facilitate efficient reading of the events of the chunks of the p-epoch.

In system 500, a chunk comprising an event in Segment 1 can be written at t1, and this chunk can be free, e.g., not already part of a p-epoch. Similarly, chunks of Segment 2, for example, can be at t2 and t3. Moreover, a chunk of Segment 3 can be at t4. Further, one chunk from each of Segments 6 and 7 can be written correspondingly at t1 and t2. Accordingly, in this example, chunks at t1, t2, and t4 can be selected. The progress step can then be determined to extend from t1 up to, but not including t5, e.g., t1≤progress step<t5. The chunks at t1, t2, t3, and t4 from each of Stream A and Stream B can then be selected because they are within the progress step. These chunks can then be merged, as is illustrated in Stream AB—Merged by P-epoch. This example can then be iterated, wherein the first free chunk can be one of the chunks from t5 from Segments 2 or 7, and the last chunk can be at t7 from Segment 1, whereby the next progress stem can be from t5 thorough t7, such that the chunks at t5, t6, and t7 from Stream A and B can be selected and merged, as is again demonstrated at Stream AB—Merged by P-epoch. Newer chunks comprising events after t7 can be then appended to the head of Stream AB—Merged by P-epoch, e.g., as the dark forward hashed portion extending to the right. This can enable merging of segments of more than one OES. It is noted that the chunks merged under P-epoch A-1 of Stream AB—Merged by P-epoch are illustrated as being readable before the chunks of P-epoch B-1 of Stream AB—Merged by P-epoch. In an aspect, this illustrates that the chunks of an P-epoch of a stream can be read together to avoid vacillating between storage schemes during the reading operation, e.g., the chunks of P-epoch A-1 of Stream AB—Merged by P-epoch can be kept together and read out before the chunks of P-epoch B-1 of Stream AB—Merged by P-epoch, rather than intermingling them and needing to correspondingly change storage schemes during the reading out. Moreover, the instant disclosure similarly supports reading out P-epoch B-1 of Stream AB—Merged by P-epoch prior to reading out P-epoch A-1 of Stream AB—Merged by P-epoch, but this is not illustrated for simplicity and clarity although it is noted that the ordering is flexible and can accommodate reading of merged P-epochs in any given order. In an aspect, the progress step of the above example can be determined to satisfy a first rule corresponding to a maximum progress window and can also be determined to satisfy a second rule related to avoiding inclusion of events stored in different epochs. As such, in a first embodiment, P-epoch A-1 can and P-epoch A-2 can comprise events from the same epoch. In a second embodiment, P-epoch A-1 can comprise events from a first epoch and P-epoch A-2 can comprise events from a second epoch. However, in both the first and second embodiments, neither P-epoch A-1, nor P-epoch A-2, can typically comprise events from different epochs, nor can the progress step exceed a maximum progress window.

Figure 6:
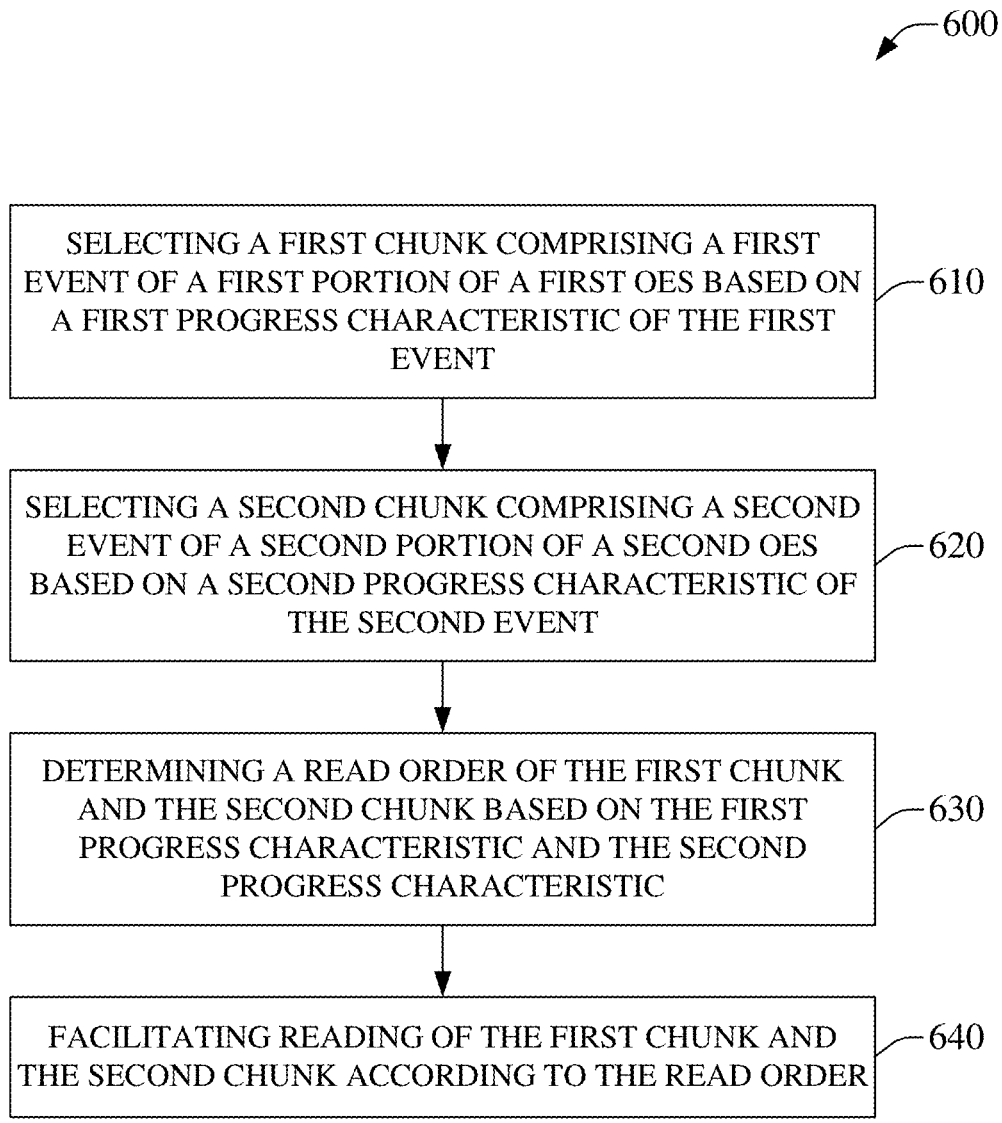
FIG. 6 is an illustration of an example method enabling merging of segments of one or more ordered event streams of an ordered event stream, in accordance with aspects of the subject disclosure.
Figure 7:
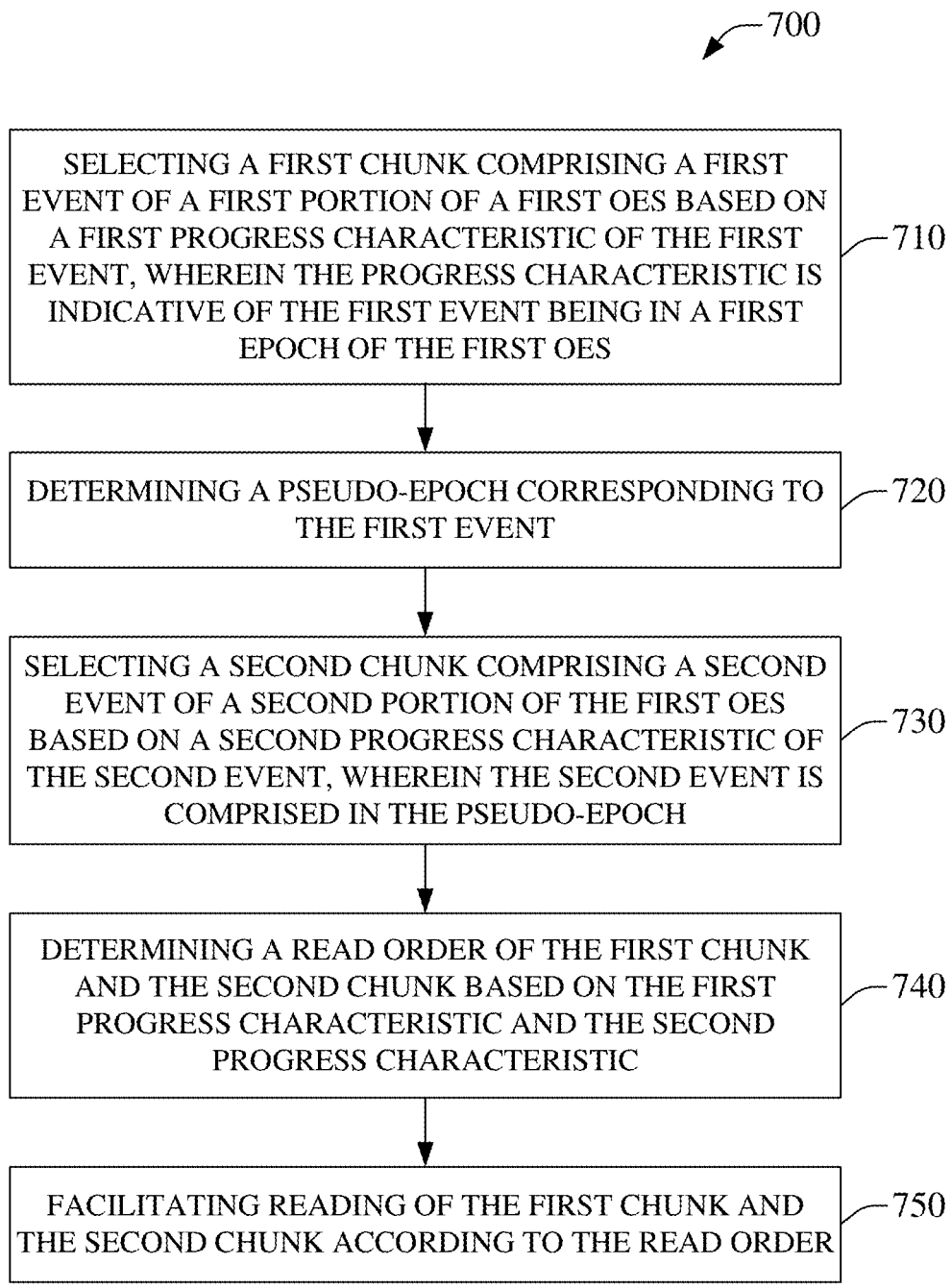
FIG. 7 is an illustration of an example method facilitating merging of segments of an ordered event stream employing different storage epochs for at least one of the segments of at least one of the ordered event streams, in accordance with aspects of the subject disclosure.
Figure 8:
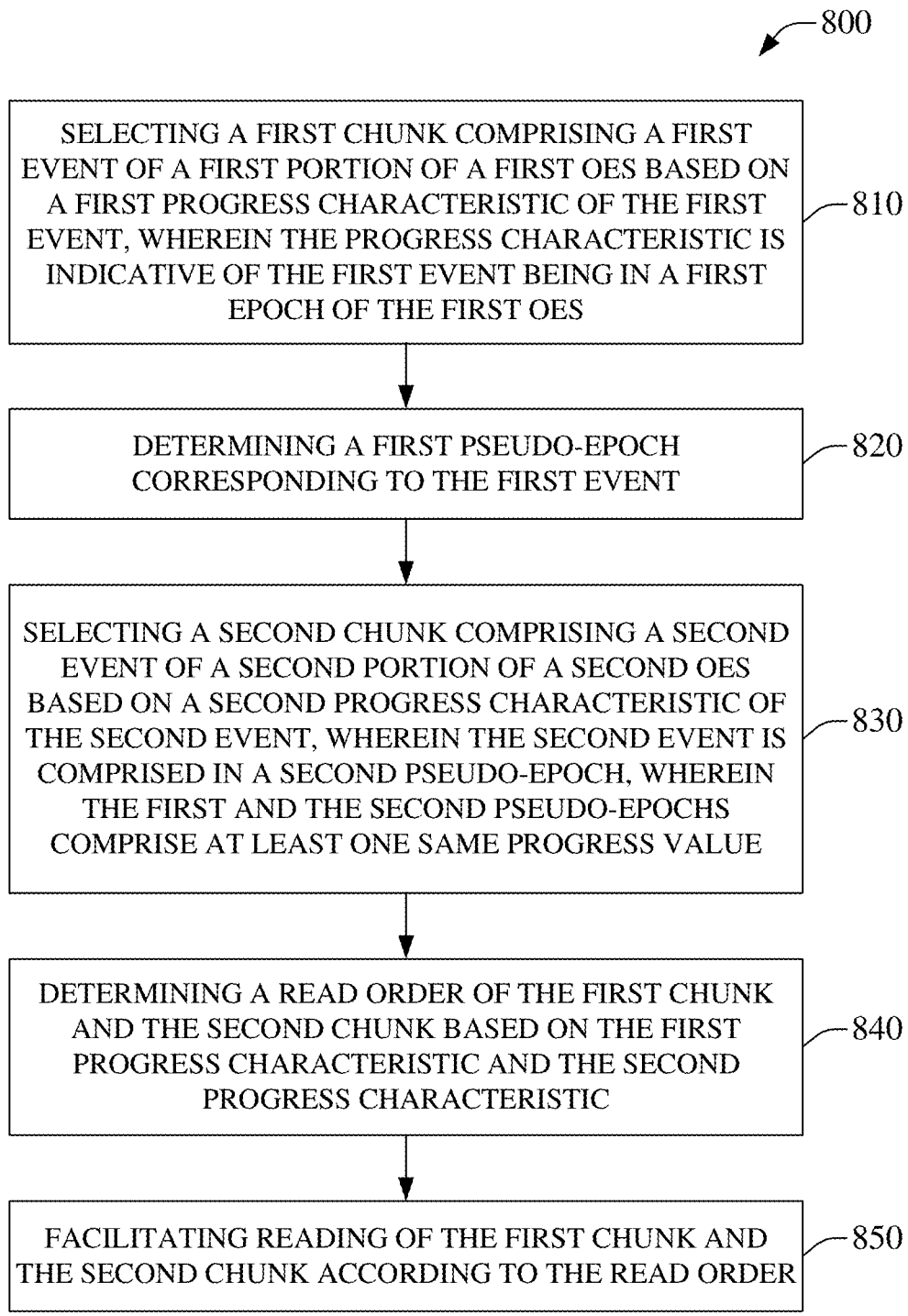
FIG. 8 is an illustration of an example method facilitating merging of segments of one or more ordered event stream employing different storage epochs for at least one of the segments of at least one of the ordered event streams, in accordance with aspects of the subject disclosure.

In view of the example system(s) described above, example method(s) that can be implemented in accordance with the disclosed subject matter can be better appreciated with reference to flowcharts in FIG. 6-FIG. 8. For purposes of simplicity of explanation, example methods disclosed herein are presented and described as a series of acts; however, it is to be understood and appreciated that the claimed subject matter is not limited by the order of acts, as some acts may occur in different orders and/or concurrently with other acts from that shown and described herein. For example, one or more example methods disclosed herein could alternately be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a described example method in accordance with the subject specification. Further yet, two or more of the disclosed example methods can be implemented in combination with each other, to accomplish one or more aspects herein described. It should be further appreciated that the example methods disclosed throughout the subject specification are capable of being stored on an article of manufacture (e.g., a computer-readable medium) to allow transporting and transferring such methods to computers for execution, and thus implementation, by a processor or for storage in a memory.

FIG. 6 is an illustration of an example method 600, which can facilitate merging of segments of one or more ordered event streams, in accordance with aspects of the subject disclosure. At 610, method 600 can comprise selecting a first chunk. The first chunk can comprise a first event of a first portion of a first OES. The selection can be based on a first progress characteristic of the first event. In an aspect, events can be written to an OES, or portion thereof, e.g., a segment. In this aspect, the writing of the event can correlate with a progress value. As such, the first progress characteristic can indicate when the event was written to the OES or OES segment, where in the progress the event occurred, e.g., when the event occurred, at what count the event occurred, etc. Moreover, the event can be stored via a chunk, wherein the chunk can also store other events or other data. As an example, a series of events can be stored via one or more chunks. In an aspect, this can facilitate storing events in different types of storage mediums, for example, storing individual events in a fast-access type of memory, storing other events via a chunk in a medium-access disk, storing still other chunks in an archival type storage format that van have comparatively slower access speeds, etc.

At 620, method 600 can comprise selecting a second chunk comprising a second event of a second portion of a second OES and the selection can be based on a second progress characteristic of the second event. As such, selection of the second chunk can be similar to the selection of the first chunk but can be relative to the second event rather than to the first event. In an aspect, the second OES can be the same OES as the first OES, e.g., enabling merging of events stored via chunks of different portions of the same OES. In an aspect, the second OES can be a different OES than the first OES, e.g., enabling merging of events stored via different OESs.

Method 600, at 630, can comprise determining a read order of the first and the second chunks. The read order can be based on the first and second progress characteristics. As an example, in FIG. 2, a first event of segment 1 and a second event of segment 2 can occur between t1 and t2, such as the first event being written at t1.1 (not illustrated in FIG. 2) and the second event being written at t1.2 (also not illustrated in FIG. 2). In this example, the events can be merged by determining that reading out of the first and second events will be in the order t1.1. then t1.2, in the order t1.2 then 1.1, etc. Generally, to preserve ordering of events in a merged ordered event stream, the events can be read out in order of increasing progress, e.g., t1.1 then t1.2, however this may not be strictly enforced where reading out events can be more efficient by exchanging a degree of ordering for a more efficient computational demand for the read operation of merged events, e.g., where reading the example first and second events slight out of proper progress order can reduce computational demand to read them out, it can be acceptable to perturb the read ordering. An example of reducing computational demand in reading out events can be reducing a number of transitions between storage schemes associated with the events being read out, as has been disclosed elsewhere herein.

At 640, method 600 can comprise facilitating reading of the first and second chunks. At this point, method 600 can end. In an aspect, the reading can be according to the read order determined at 630. As an example, where it can be less computationally demanding to read out the second event of the above example, e.g., written at t1.2, before reading out the first event written at t1.1, then the read order can indicate reading t1.2 then t1.1. In this example, at 640, method 600 can facilitate reading of the second event then the first event, e.g., in reverse of the progress order, for the reasons disclosed herein. In an aspect, facilitating the reading can comprise enabling reading of the corresponding events. In another aspect, the facilitating can comprise storing the read order determined at 630 to enable later and/or repeated reading of the merged event stream. In a further aspect, the facilitating can comprise rewriting the stored events in chunks to facilitate improved reading of the merged events. As an example, where the merged streams of events will be regularly accessed, it can be more efficient to rewrite chunks comprising the events of the merged stream, e.g., to reduce seek time, etc., than to merely store the locations of the several events stored via different chunks that can be associated with increased seek times for the individual events in the merged order. The presently disclosed subject matter explicitly considers any combination of storing an order and/or rewriting stored events in a more streamlined manner to be within the scope of the instant disclosure even though not further discussed at length for the sake of clarity and brevity.

FIG. 7 is an illustration of an example method 700, which can facilitate merging of segments of an ordered event stream employing different storage epochs for at least one of the segments of at least one of the ordered event streams, in accordance with aspects of the subject disclosure. At 710, method 700 can comprise selecting a first chunk. The first chunk can comprise a first event of a first portion of a first OES. The selection can be based on a first progress characteristic of the first event. In an aspect, events can be written to an OES, or portion thereof and the writing of the event can correlate with a progress value. The progress of an OES/segment can be associated with an epoch, wherein an epoch can denote progress in which the writing of events is according a corresponding storage scheme. Accordingly, a change to the storage scheme can be indicative of an end of an epoch and the start of another epoch. As an example, scaling up segments of an OES, scaling down segments of an OES, altering a key space for a segment of an OES, etc., can be associated with an epoch change because the storage scheme before and after the scaling/key space change can be distinct from the storage scheme after. Whereas changes tot eh storage scheme can be associated with changes in reading corresponding events out, which can propagate to increased computing resource demands, it can be desirable to group event reads to reduce a number of storage scheme transitions needed to read out events, even to the degree that strict ordering of events in not perfectly maintained. The first progress characteristic can indicate when the event was written to the OES or OES segment, where in the progress the event occurred, e.g., when the event occurred, at what count the event occurred, etc. This can be associated with the epoch in which the event occurred, was written, etc. This epoch information can be retained when the event is stored via a chunk and can be needed to enable reading of the event according to the appropriate storage scheme.

At 720, method 700 can comprise determining a pseudo-epoch corresponding to the first event. A pseudo-epoch can be a subset of progress within an epoch. Generally a pseudo-epoch will not transition a boundary between epochs. This can avoid grouping of events in a pseudo-epoch that correspond to different storage schemes from different epochs. Moreover, a pseudo-epoch can be less than a selected and/or designated maximum progress window. By keeping a size of a pseudo-epoch under a maximum value, the scale of perturbation to an ordering of events during a read of events within the p-epoch can be correspondingly limited. As an example, if a p-epoch has a maximum progress window of two days, then events read out can be no more out of order than two days, which can be in contrast to a maximum progress window of one year that can result in improper ordering of events by as much as a year. As such, pseudo-epochs can be viewed as compartmentalizing events within an epoch to allow disordering of events in the pseudo-epoch, e.g., to reduce demand on computing resources that can stem from reading events with many changes to corresponding storage schemes, to be similarly compartmentalized in contrast to reordering according to an entire epoch.

In an aspect, the pseudo-epoch can be, for example, determined by selecting an oldest free chunk from each segment being merged. A chunk can be said to be free where it is not already part of another pseudo-epoch. The oldest and newest of these oldest chunks can be employed to determine a minimal and a maximal progress point, e.g., a progress step as disclosed elsewhere herein. As an example, in FIG. 3, the oldest chunk of each of segments 1 to 3 are correspondingly at progress points t1, t2, and t4, and therefore the progress step can be determined to extend from t1 up to, but not including, t5. At this point, all chunks that are within the progress step for the segments being merged can be identified. Using the above example, in FIG. 3, the chunks corresponding to the events written at t1, t2, t3, and t4 can be identified as being within the progress step. The pseudo-epoch can comprise these identified chunks. It is noted that the first chunk selected at 710 can be the oldest chunk of the pseudo-epoch, e.g., the first chunk can be the same chunk as the chunk comprising the event written at t1 in the above example.

At 730, method 700 can comprise selecting a second chunk comprising a second event of a second portion of the first OES and the selection can be based on a second progress characteristic of the second event. In an aspect, the second event can be within the pseudo-epoch determined form the first event at 720. As such, selection of the second chunk can be similar to the selection of the first chunk, and the first and second events can be of the same pseudo-epoch. As an example, in FIG. 3, P-epoch 1 can comprise four events from segments 1 to 3, e.g., and t1, t2, t3, and t4. In this example, the second chunk can be a chunk storing an event at any one of t2, t3, or t4. Moreover, where additional chunks will be merged as part of merging two or more segments, additional chunks can be selected in a manner similar to that described for 730 of method 700, e.g., allowing for selection of chunks comprising all of t1, 2, t3, and t4 in the above example.

Method 700, at 740, can comprise determining a read order of the first chunk, the second chunk, etc., e.g., the read order of the chunks of t1, t2, t3, and t4 in the above example. The read order can be based on the first progress characteristic, the second progress characteristic, etc. Generally, it can be desirable to preserve ordering of events in a merged ordered event stream, e.g., the events can be read out in order of increasing progress. The use of pseudo-epochs can ensure that the events being incorporated into a merged stream are of the same epoch, e.g., by being in the same pseudo-epoch the events can be associated with the same storage scheme. This can allow for reading of the events of pseudo-epoch in their relative order of progress without fear of improper ordering because there is no reason to reorder the events to conserve computing resources due to there being no change in storage scheme across the events of the same pseudo-epoch.

At 750, method 700 can comprise facilitating reading of the first and second chunks. At this point, method 700 can end. In an aspect, the reading can be according to the read order determined at 740. It can be appreciated that determining a pseudo-epoch can enable selection of chunks having events of the same epoch and can therefore allow for preservation of event order while also allowing for efficient use of computing resources when merging segments of an OES. However, where segments of different OESs are to be merged, the possibility of losing some degree of proper ordering can again arise. This aspect is discussed elsewhere herein, for example, in method 800, etc.

FIG. 8 is an illustration of an example method 800, which can enable merging of segments of one or more ordered event stream employing different storage epochs for at least one of the segments of at least one of the ordered event streams, in accordance with aspects of the subject disclosure. At 810, method 800 can comprise selecting a first chunk. The first chunk can comprise a first event of a first portion of a first OES. The selection can be based on a first progress characteristic of the first event. In an aspect, events can be written to an OES, or portion thereof and the writing of the event can correlate with a progress value. The progress of an OES/segment can be associated with an epoch, wherein an epoch can denote progress in which the writing of events is according a corresponding storage scheme. Accordingly, a change to the storage scheme can be indicative of an end of an epoch and the start of another epoch. Whereas changes to the storage scheme can be associated with changes in reading corresponding events out, which can propagate to increased computing resource demands, it can be desirable to group event reads to reduce a number of storage scheme transitions needed to read out events, even to the degree that strict ordering of events in not perfectly maintained. The first progress characteristic can indicate when the event was written to the OES or OES segment, where in the progress the event occurred, e.g., when the event occurred, at what count the event occurred, etc. This can be associated with the epoch in which the event occurred, was written, etc. This epoch information can be retained when the event is stored via a chunk and can be needed to enable reading of the event according to the appropriate storage scheme.

At 820, method 800 can comprise determining a pseudo-epoch corresponding to the first event. A pseudo-epoch can be a subset of progress within an epoch. Generally a pseudo-epoch will not transition a boundary between epochs. This can avoid grouping of events in a pseudo-epoch that correspond to different storage schemes from different epochs. Moreover, a pseudo-epoch can be less than a selected and/or designated maximum progress window. By keeping a size of a pseudo-epoch under a maximum value, the scale of perturbation to an ordering of events during a read of events within the p-epoch can be correspondingly limited. As such, pseudo-epochs can be viewed as compartmentalizing events within an epoch to allow any disordering of events in the pseudo-epoch to be limited by the compartmentalization in contrast to reordering of an entire epoch.

In an aspect, the pseudo-epoch can be, for example, determined by selecting an oldest free chunk from each segment being merged of the first OES. A separate pseudo-epoch can be determined for segments of other OESs that are to be merged with the segments of the first OES. The oldest and newest of these oldest chunks of the first OES can be employed to determine a minimal and a maximal progress point for the first OES, e.g., a progress step as disclosed elsewhere herein. As an example, in FIG. 5, the oldest chunk of each of segments 1 to 3 are correspondingly at progress points t1, t2, and t4, and therefore the progress step can be determined to extend from t1 up to, but not including, t5. At this point, all chunks that are within the progress step for the segments of the first OES being merged can be identified, e.g., within P-epoch A-1. Using the above example, in FIG. 5, the chunks corresponding to the events written at t1, t2, t3, and t4 can be identified as being within the progress step. The pseudo-epoch of the first OES, e.g., P-epoch A-1, can comprise these identified chunks. It is noted that the first chunk selected at 810 can be the oldest chunk of the pseudo-epoch, e.g., the first chunk can be the same chunk as the chunk comprising the event written at t1 in the above example.

At 830, method 800 can comprise selecting a second chunk comprising a second event of a second portion of a second OES and the selection can be based on a second progress characteristic of the second event. In an aspect, the second event can be within a second pseudo-epoch determined in a manner similar to that disclosed for 820, except in regard to the second OES. As such, selection of the second chunk can be similar to the selection of the first chunk. In an aspect, a same progress point can be comprised in both the first and second pseudo-epoch, e.g., the first and second pseudo-epochs can comprise events that occur proximate to a same progress point. As an example, in FIG. 5, P-epoch B-1 can comprise two events from segments 6 to 7, e.g., at t1 and t2, wherein t1 and t2 are progress points that can also be in the first pseudo-epoch P-epoch A-1. In this example, the second chunk can be a chunk storing an event at any one of t1 or t2 in Stream B. Moreover, where additional chunks, e.g., chunks at t1, t2, t3, t4 of Stream A, chunks at t1 or t2 of Stream B, etc., that will be merged as part of merging two or more segments from different OESs, these additional chunks can be selected by iterating method 800 from 810 to 830 to find chunks of pseudo-epochs that can be merged as part of merging the segments of the several ordered event streams.

Method 800, at 840, can comprise determining a read order of the first chunk, the second chunk, etc., e.g., the read order of the chunks at t1, t2, t3, and t4 of Stream A in the above example can be group together because they are of a same storage scheme, e.g., a first storage scheme corresponding to the same first pseudo-epoch, and the read order of the chunks at t1 and t2 of Stream B in the above example can be group together because they are also of a same storage scheme, e.g., a second storage scheme corresponding to the same second pseudo-epoch. It is noted that some events of the first and second pseudo-epoch occur at the same progress point, e.g., events of both Stream A and Stream B in the example occur at t1 and t2. As such, reading all of P-epoch A-1 events out together followed by reading out all of P-epoch B-1 events out results in disturbance of the true order in which the events were written, but that reading in this manner reduces the transitions between storage schemes in comparison to interleaving the individual events. In an aspect, the use of a pseudo-epoch can limit the breadth of the progress window to avoid excessive loss of order that could occur with reading out all events of an entire epoch (or a larger pseudo-epoch window) together to limit transitioning between storage schemes. As such, the demonstrated example that determined a pseudo-epoch progress step that covers events in each segment to be merged per OES to be merged can provide for less disturbance to event ordering that other techniques while also providing less computing resource demand (from Storage schemes switching) than other techniques, e.g., it can provide an acceptable balance. Moreover, the maximum progress window rule, the prohibition against transitioning epochs rule, etc., can avoid accidentally large progress windows, for example, where a segment can have long progress periods between events, etc. In an aspect, the read order between the first and second pseudo-epoch can be based on the first progress characteristic, the second progress characteristic, etc. As is illustrated in FIG. 5, the events of P-epoch A-1 can be read first, then the events of P-epoch B-1, etc. However, this could just as easily be illustrated to read events of P-epoch B-1 first, then the events of P-epoch A-1, etc., without departing from the scope of the instant disclosure.

At 850, method 800 can comprise facilitating reading of the first and second chunks. At this point, method 800 can end. In an aspect, the reading can be according to the read order determined at 840. It is illustrated that determining a pseudo-epoch can enable selection of chunks having events of the same epoch and can therefore allow for preservation of event order while also allowing for efficient use of computing resources when merging with events of segments of other OESs. As such, where segments of different OESs are to be merged, the possibility of losing some degree of proper ordering can be an acceptable tradeoff to reduce computational demand. Moreover, selection of a maximum progress window can further limit runaway progress step size and selectively limit possible loss of proper ordering to less than the maximum progress window size as is is discussed elsewhere herein.

Figure 9:
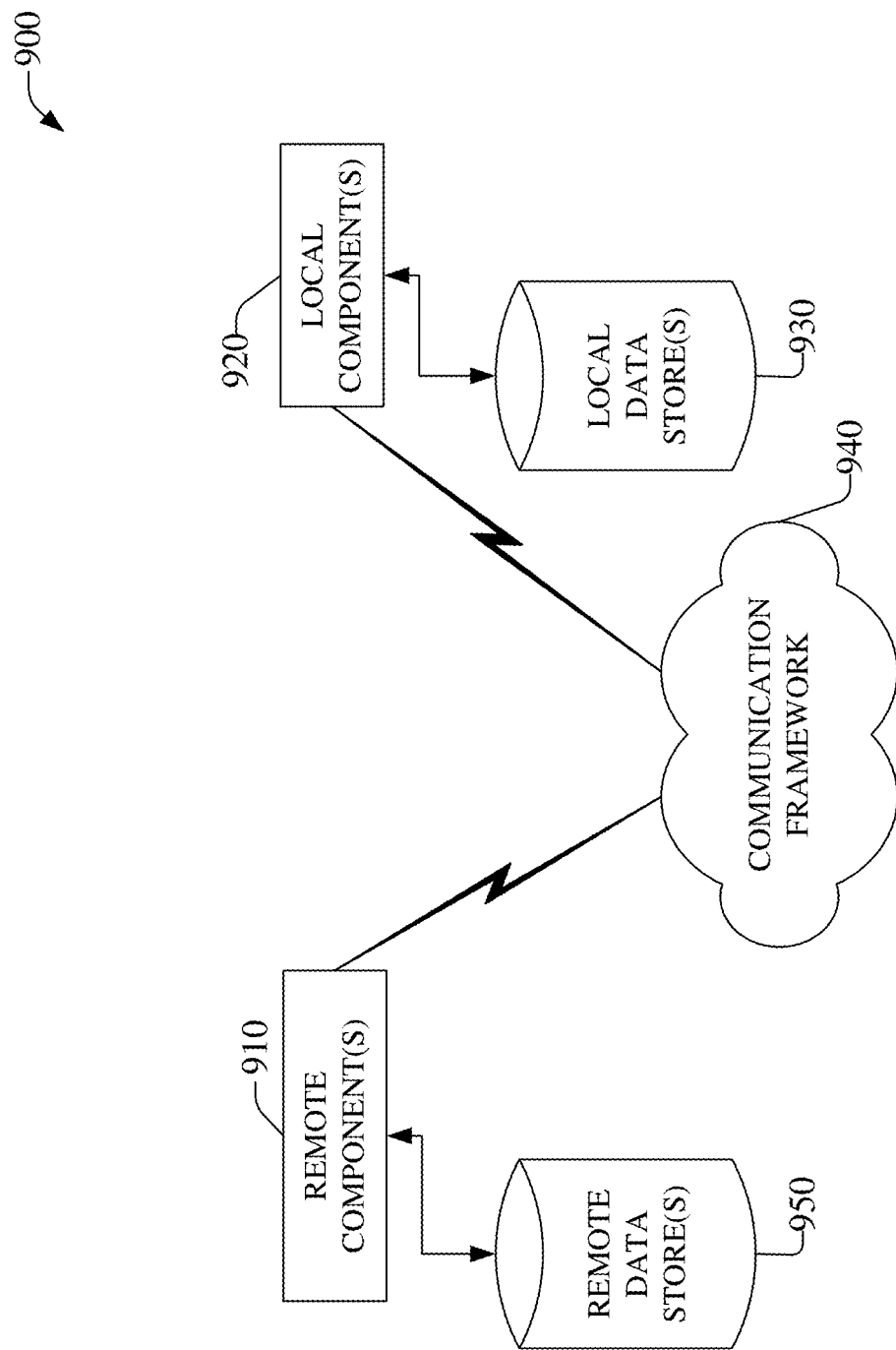
FIG. 9 depicts an example schematic block diagram of a computing environment with which the disclosed subject matter can interact.

FIG. 9 is a schematic block diagram of a computing environment 900 with which the disclosed subject matter can interact. The system 900 comprises one or more remote component(s) 910. The remote component(s) 910 can be hardware and/or software (e.g., threads, processes, computing devices). In some embodiments, remote component(s) 910 can be a remotely located device comprised in storage component 102, a remotely located processor device comprised in processor component 104, a remotely located device comprised in stream merging component 120, etc., connected to a local component via communication framework 940. Communication framework 940 can comprise wired network devices, wireless network devices, mobile devices, wearable devices, radio access network devices, gateway devices, femtocell devices, servers, etc.

The system 900 also comprises one or more local component(s) 920. The local component(s) 920 can be hardware and/or software (e.g., threads, processes, computing devices). In some embodiments, local component(s) 920 can comprise a local device comprised in storage component 102, a processor device comprised in processor component 104, a device comprised in stream merging component 120, etc.

One possible communication between a remote component(s) 910 and a local component(s) 920 can be in the form of a data packet adapted to be transmitted between two or more computer processes. Another possible communication between a remote component(s) 910 and a local component(s) 920 can be in the form of circuit-switched data adapted to be transmitted between two or more computer processes in radio time slots. The system 900 comprises a communication framework 940 that can be employed to facilitate communications between the remote component(s) 910 and the local component(s) 920, and can comprise an air interface, e.g., Uu interface of a UMTS network, via a long-term evolution (LTE) network, etc. Remote component(s) 910 can be operably connected to one or more remote data store(s) 950, such as a hard drive, solid state drive, SIM card, device memory, etc., that can be employed to store information on the remote component(s) 910 side of communication framework 940. Similarly, local component(s) 920 can be operably connected to one or more local data store(s) 930, that can be employed to store information on the local component(s) 920 side of communication framework 940. As examples, writing, reading, rewriting, etc., of events of segments of an OES(s) in systems 100, 200, 300, 400, 500, etc., can be communicated via communication framework 940 among storage components of an OES storage network 100, 200, 300, 400, 500, etc., e.g., to facilitate adapting, altering, modifying, merging, etc., a topology of one or more OES(s), as disclosed herein.

Figure 10:
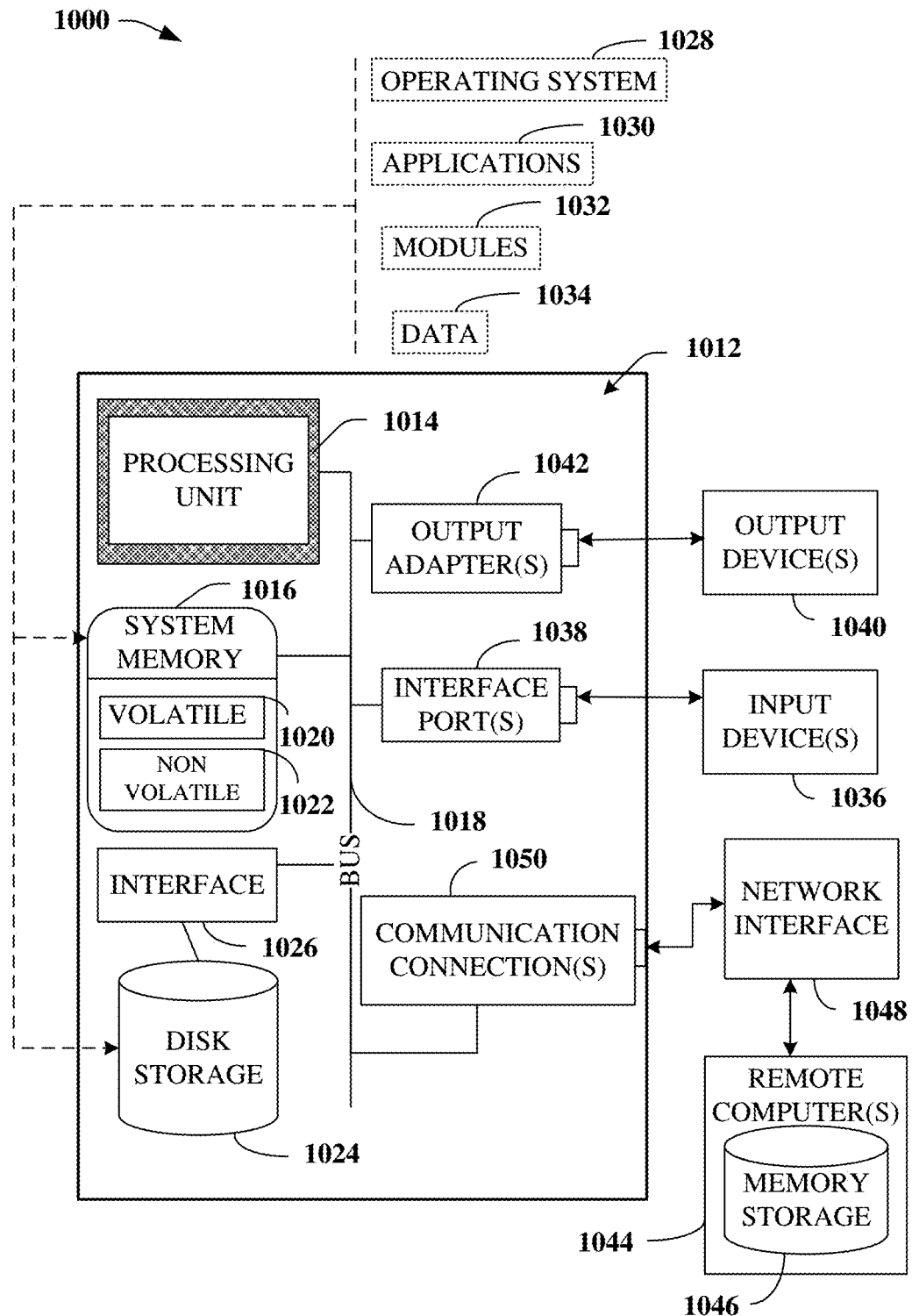
FIG. 10 illustrates an example block diagram of a computing system operable to execute the disclosed systems and methods in accordance with an embodiment.

In order to provide a context for the various aspects of the disclosed subject matter, FIG. 10, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that performs particular tasks and/or implement particular abstract data types.

In the subject specification, terms such as "store," "storage," "data store," "data storage," "database," and substantially any other information storage component relevant to operation and functionality of a component, refer to "memory components," or entities embodied in a "memory" or components comprising the memory. It is noted that the memory components described herein can be either volatile memory or nonvolatile memory, or can comprise both volatile and nonvolatile memory, by way of illustration, and not limitation, volatile memory 1020 (see below), nonvolatile memory 1022 (see below), disk storage 1024 (see below), and memory storage 1046 (see below). Further, nonvolatile memory can be included in read only memory, programmable read only memory, electrically programmable read only memory, electrically erasable read only memory, or flash memory. Volatile memory can comprise random access memory, which acts as external cache memory. By way of illustration and not limitation, random access memory is available in many forms such as synchronous random access memory, dynamic random access memory, synchronous dynamic random access memory, double data rate synchronous dynamic random access memory, enhanced synchronous dynamic random access memory, SynchLink dynamic random access memory, and direct Rambus random access memory. Additionally, the disclosed memory components of systems or methods herein are intended to comprise, without being limited to comprising, these and any other suitable types of memory.

Moreover, it is noted that the disclosed subject matter can be practiced with other computer system configurations, comprising single-processor or multiprocessor computer systems, mini-computing devices, mainframe computers, as well as personal computers, hand-held computing devices (e.g., personal digital assistant, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

FIG. 10 illustrates a block diagram of a computing system 1000 operable to execute the disclosed systems and methods in accordance with an embodiment. Computer 1012, which can be, for example, comprised in any of storage component 102, processor component 104, stream merging component 120, etc., can comprise a processing unit 1014, a system memory 1016, and a system bus 1018. System bus 1018 couples system components comprising, but not limited to, system memory 1016 to processing unit 1014. Processing unit 1014 can be any of various available processors. Dual microprocessors and other multiprocessor architectures also can be employed as processing unit 1014.

System bus 1018 can be any of several types of bus structure(s) comprising a memory bus or a memory controller, a peripheral bus or an external bus, and/or a local bus using any variety of available bus architectures comprising, but not limited to, industrial standard architecture, microchannel architecture, extended industrial standard architecture, intelligent drive electronics, video electronics standards association local bus, peripheral component interconnect, card bus, universal serial bus, advanced graphics port, personal computer memory card international association bus, Firewire (Institute of Electrical and Electronics Engineers 1194), and small computer systems interface.

System memory 1016 can comprise volatile memory 1020 and nonvolatile memory 1022. A basic input/output system, containing routines to transfer information between elements within computer 1012, such as during start-up, can be stored in nonvolatile memory 1022. By way of illustration, and not limitation, nonvolatile memory 1022 can comprise read only memory, programmable read only memory, electrically programmable read only memory, electrically erasable read only memory, or flash memory. Volatile memory 1020 comprises read only memory, which acts as external cache memory. By way of illustration and not limitation, read only memory is available in many forms such as synchronous random access memory, dynamic read only memory, synchronous dynamic read only memory, double data rate synchronous dynamic read only memory, enhanced synchronous dynamic read only memory, SynchLink dynamic read only memory, Rambus direct read only memory, direct Rambus dynamic read only memory, and Rambus dynamic read only memory.

Computer 1012 can also comprise removable/non-removable, volatile/non-volatile computer storage media. FIG. 10 illustrates, for example, disk storage 1024. Disk storage 1024 comprises, but is not limited to, devices like a magnetic disk drive, floppy disk drive, tape drive, flash memory card, or memory stick. In addition, disk storage 1024 can comprise storage media separately or in combination with other storage media comprising, but not limited to, an optical disk drive such as a compact disk read only memory device, compact disk recordable drive, compact disk rewritable drive or a digital versatile disk read only memory. To facilitate connection of the disk storage devices 1024 to system bus 1018, a removable or non-removable interface is typically used, such as interface 1026.

Computing devices typically comprise a variety of media, which can comprise computer-readable storage media or communications media, which two terms are used herein differently from one another as follows.

Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, read only memory, programmable read only memory, electrically programmable read only memory, electrically erasable read only memory, flash memory or other memory technology, compact disk read only memory, digital versatile disk or other optical disk storage, magnetic cassettes, magnetic tape, magnetic disk storage or other magnetic storage devices, or other tangible media which can be used to store desired information. In this regard, the term "tangible" herein as may be applied to storage, memory or computer-readable media, is to be understood to exclude only propagating intangible signals per se as a modifier and does not relinquish coverage of all standard storage, memory or computer-readable media that are not only propagating intangible signals per se. In an aspect, tangible media can comprise non-transitory media wherein the term "non-transitory" herein as may be applied to storage, memory or computer-readable media, is to be understood to exclude only propagating transitory signals per se as a modifier and does not relinquish coverage of all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium. As such, for example, a computer-readable medium can comprise executable instructions stored thereon that, in response to execution, can cause a system comprising a processor to perform operations comprising determining a read order of merged events stored via an ordered event stream storage system. The events can be stored in different OESs and according to different storage schemes, typically arranged in epochs. The read order can be based on a progress step associated with a first pseudo-epoch corresponding to first events of the first portion of the first epoch and a second pseudo-epoch corresponding to second events of the second portion of the second epoch. The operations can further comprise enabling reading of events according to the read order of the merged events. The read order of the merged events can be different than the write order of the same events. However, the read order of the merged events can reduce transitions between the different storage schemes in comparison to reading the merged events in the order they were written.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

It can be noted that FIG. 10 describes software that acts as an intermediary between users and computer resources described in suitable operating environment 1000. Such software comprises an operating system 1028. Operating system 1028, which can be stored on disk storage 1024, acts to control and allocate resources of computer system 1012. System applications 1030 take advantage of the management of resources by operating system 1028 through program modules 1032 and program data 1034 stored either in system memory 1016 or on disk storage 1024. It is to be noted that the disclosed subject matter can be implemented with various operating systems or combinations of operating systems.

A user can enter commands or information into computer 1012 through input device(s) 1036. In some embodiments, a user interface can allow entry of user preference information, etc., and can be embodied in a touch sensitive display panel, a mouse/pointer input to a graphical user interface (GUI), a command line controlled interface, etc., allowing a user to interact with computer 1012. Input devices 1036 comprise, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1014 through system bus 1018 by way of interface port(s) 1038. Interface port(s) 1038 comprise, for example, a serial port, a parallel port, a game port, a universal serial bus, an infrared port, a Bluetooth port, an IP port, or a logical port associated with a wireless service, etc. Output device(s) 1040 use some of the same type of ports as input device(s) 1036.

Thus, for example, a universal serial bus port can be used to provide input to computer 1012 and to output information from computer 1012 to an output device 1040. Output adapter 1042 is provided to illustrate that there are some output devices 1040 like monitors, speakers, and printers, among other output devices 1040, which use special adapters. Output adapters 1042 comprise, by way of illustration and not limitation, video and sound cards that provide means of connection between output device 1040 and system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. Remote computer(s) 1044 can be a personal computer, a server, a router, a network PC, cloud storage, a cloud service, code executing in a cloud-computing environment, a workstation, a microprocessor-based appliance, a peer device, or other common network node and the like, and typically comprises many or all of the elements described relative to computer 1012. A cloud computing environment, the cloud, or other similar terms can refer to computing that can share processing resources and data to one or more computer and/or other device(s) on an as needed basis to enable access to a shared pool of configurable computing resources that can be provisioned and released readily. Cloud computing and storage solutions can store and/or process data in third-party data centers which can leverage an economy of scale and can view accessing computing resources via a cloud service in a manner similar to a subscribing to an electric utility to access electrical energy, a telephone utility to access telephonic services, etc.

For purposes of brevity, only a memory storage device 1046 is illustrated with remote computer(s) 1044. Remote computer(s) 1044 is logically connected to computer 1012 through a network interface 1048 and then physically connected by way of communication connection 1050. Network interface 1048 encompasses wire and/or wireless communication networks such as local area networks and wide area networks. Local area network technologies comprise fiber distributed data interface, copper distributed data interface, Ethernet, Token Ring and the like. Wide area network technologies comprise, but are not limited to, point-to-point links, circuit-switching networks like integrated services digital networks and variations thereon, packet switching networks, and digital subscriber lines. As noted below, wireless technologies may be used in addition to or in place of the foregoing.

Communication connection(s) 1050 refer(s) to hardware/software employed to connect network interface 1048 to bus 1018. While communication connection 1050 is shown for illustrative clarity inside computer 1012, it can also be external to computer 1012. The hardware/software for connection to network interface 1048 can comprise, for example, internal and external technologies such as modems, comprising regular telephone grade modems, cable modems and digital subscriber line modems, integrated services digital network adapters, and Ethernet cards.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. Moreover, the use of any particular embodiment or example in the present disclosure should not be treated as exclusive of any other particular embodiment or example, unless expressly indicated as such, e.g., a first embodiment that has aspect A and a second embodiment that has aspect B does not preclude a third embodiment that has aspect A and aspect B. The use of granular examples and embodiments is intended to simplify understanding of certain features, aspects, etc., of the disclosed subject matter and is not intended to limit the disclosure to said granular instances of the disclosed subject matter or to illustrate that combinations of embodiments of the disclosed subject matter were not contemplated at the time of actual or constructive reduction to practice.

Further, the term "include" is intended to be employed as an open or inclusive term, rather than a closed or exclusive term. The term "include" can be substituted with the term "comprising" and is to be treated with similar scope, unless otherwise explicitly used otherwise. As an example, "a basket of fruit including an apple" is to be treated with the same breadth of scope as, "a basket of fruit comprising an apple."

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities, machine learning components, or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks comprise broadcast technologies (e.g., sub-Hertz, extremely low frequency, very low frequency, low frequency, medium frequency, high frequency, very high frequency, ultra-high frequency, super-high frequency, extremely high frequency, terahertz broadcasts, etc.); Ethernet; X.25; powerline-type networking, e.g., Powerline audio video Ethernet, etc.; femtocell technology; Wi-Fi; worldwide interoperability for microwave access; enhanced general packet radio service; second generation partnership project (2G or 2GPP); third generation partnership project (3G or 3GPP); fourth generation partnership project (4G or 4GPP); long term evolution (LTE); fifth generation partnership project (5G or 5GPP); third generation partnership project universal mobile telecommunications system; third generation partnership project 2; ultra mobile broadband; high speed packet access; high speed downlink packet access; high speed uplink packet access; enhanced data rates for global system for mobile communication evolution radio access network; universal mobile telecommunications system terrestrial radio access network; or long term evolution advanced. As an example, a millimeter wave broadcast technology can employ electromagnetic waves in the frequency spectrum from about 30 GHz to about 300 GHz. These millimeter waves can be generally situated between microwaves (from about 1 GHz to about 30 GHz) and infrared (IR) waves, and are sometimes referred to extremely high frequency (EHF). The wavelength ($\lambda$) for millimeter waves is typically in the 1-mm to 10-mm range.

The term "infer" or "inference" can generally refer to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference, for example, can be employed to identify a specific context or action, or can generate a probability distribution over states of interest based on a consideration of data and events. Inference can also refer to techniques employed for composing higher-level events from a set of events and/or data. Such inference results in the construction of new events or actions from a set of observed events and/or stored event data, whether the events, in some instances, can be correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

What has been described above includes examples of systems and methods illustrative of the disclosed subject matter. It is, of course, not possible to describe every combination of components or methods herein. One of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A system, comprising:
a processor; and
a memory that stores executable instructions that, when executed by the processor, facilitate performance of operations, comprising:
receiving an indication to merge a first portion of a first ordered event stream and a second portion of a second ordered event stream, wherein the first ordered event stream and the second ordered event stream are stored via an ordered event stream storage system;
determining a read order of events of the first portion of the first ordered event stream and the second portion of the second ordered event stream, wherein the read order supports out of order reading of an event, and wherein the out of order reading is a different order than a first writing order of events of the first event stream and a second writing order of events of the second event stream; and
enabling reading of the events of the first portion of the first ordered event stream and the second portion of the second ordered event stream according to the read order.

2. The system of claim 1, wherein the read order is preserved to facilitate future reads of the first portion of the first ordered event stream and the second portion of the second ordered event stream according to the read order.

3. The system of claim 1, wherein the events of the first portion of the first ordered event stream and the second portion of the second ordered event stream are rewritten to reduce seek times corresponding to reading the events according to the read order.

4. The system of claim 1, wherein the first ordered event stream and the second ordered event stream are a same ordered event stream.

5. The system of claim 1, wherein the first ordered event stream and the second ordered event stream are different ordered event streams.

6. The system of claim 5, wherein the first portion of the first ordered event stream corresponds to a first event storage scheme, wherein the second portion of the second ordered event stream corresponds to a second event storage scheme, and wherein the first event storage scheme and the second event storage scheme are a same event storage scheme.

7. The system of claim 5, wherein the first portion of the first ordered event stream corresponds to a first event storage scheme, wherein the second portion of the second ordered event stream corresponds to a second event storage scheme, and wherein the first event storage scheme and the second event storage scheme are different event storage schemes.

8. The system of claim 7, wherein the operations further comprise:
determining a first pseudo-epoch comprising first events of the first portion of the first ordered event stream;
determining a second pseudo-epoch comprising second events of the second portion of the second ordered event stream; and
wherein the determining a read order of events of the first portion of the first ordered event stream and the second portion of the second ordered event stream comprises determining a progress step read order of the first events and the second events according to the first pseudo-epoch and the second pseudo-epoch.

9. The system of claim 8, wherein the first pseudo-epoch does not comprise events from more than one epoch of the first portion of the first ordered event stream, and wherein the second pseudo-epoch does not comprise events from more than one epoch of the second portion of the second ordered event stream.

10. The system of claim 8, wherein the first pseudo-epoch does not exceed a first maximum progress window size, and wherein the second pseudo-epoch does not exceed a second maximum progress window size.

11. The system of claim 8, wherein the determining the progress step read order of the first events and the second events according to the first pseudo-epoch and the second pseudo-epoch results in reading the events of the first portion of the first ordered event stream and the second portion of the second ordered event stream in an order that is a different order than the events were written to the first portion of the first ordered event stream and the second portion of the second ordered event stream.

12. The system of claim 8, wherein the determining the progress step read order of the first events and the second events according to the first pseudo-epoch and the second pseudo-epoch results in reading the events of the first portion of the first ordered event stream and the second portion of the second ordered event stream with less vacillation between the first event storage scheme and the second event storage scheme than would be experienced where the events of the first portion of the first ordered event stream and the second portion of the second ordered event stream are read in the order than the events were written to the first portion of the first ordered event stream and the second portion of the second ordered event stream.

13. The system of claim 1, wherein the first portion of the first ordered event stream comprises first events stored in a first type of data storage and comprises second events stored in a second type of data storage.

14. The system of claim 13, wherein the first type of data storage enables faster access to data than the second type of data storage.

15. A method, comprising:
  determining, by a system comprising a processor, a read order of merged events of a first portion of a first ordered event stream and a second portion of a second ordered event stream, wherein the first ordered event stream and the second ordered event stream are stored via an ordered event stream storage system, wherein the read order of the merged events comprises an out of order event read in comparison to a writing order of events into the first event stream and the second event stream, wherein the first ordered event stream and the second ordered event stream are different ordered event streams, wherein the first ordered event stream employs a first event storage scheme corresponding to a first epoch, wherein the second ordered event stream employs a second event storage scheme corresponding to a second epoch, and wherein the read order is based on a progress step associated with a first pseudo-epoch corresponding to first events of the first portion of the first epoch and a second pseudo-epoch corresponding to second events of the second portion of the second epoch; and
  reading, by the system, the first events of the first portion of the first epoch and the second events of the second portion of the second epoch according to the read order of the merged events.

16. The method of claim 15, further comprising performing, by the system, an operation selected from a group of operations comprising a storing operation that stores the read order of merged events to facilitate future reads of the merged events, and a relocation operation that relocates the first events and the second events in the ordered event stream storage system to reduce seek times associated with reading the merged events.

17. The method of claim 15, wherein the determining the read order of the merged events comprises determining the first pseudo-epoch and the second pseudo-epoch, wherein the first and second pseudo-epoch are each smaller than a selectable maximum progress size, wherein the first and second pseudo-epoch each do not transition an epoch boundary, and wherein the first and second pseudo-epoch each comprise a same progress point.

18. A non-transitory machine-readable medium, comprising executable instructions that, when executed by a processor, facilitate performance of operations, comprising:
  in response to receiving a merge events instruction, determining a read order of merged events of a first portion of a first ordered event stream and a second portion of a second ordered event stream, wherein:
    the read order of the merged events corresponds to reading events in a different order than another order in which those events were written into the first event stream and the second event stream,
    the first ordered event stream and the second ordered event stream are stored via an ordered event stream storage system,
    the first ordered event stream and the second ordered event stream are different ordered event streams,
    the first ordered event stream employs a first event storage scheme corresponding to a first epoch,
    the second ordered event stream employs a second event storage scheme corresponding to a second epoch, and
    the read order is based on a progress step associated with a first pseudo-epoch corresponding to first events of the first portion of the first epoch and a second pseudo-epoch corresponding to second events of the second portion of the second epoch; and
  enabling reading of the first events of the first portion of the first epoch and the second events of the second portion of the second epoch according to the read order of the merged events, wherein the read order of the merged events is different than the write order of events comprising the merged events, and wherein the read order of the merged events reduces transitions between the first event storage scheme and the second event storage scheme in comparison to reading the merged events in the order they were written to the ordered event stream storage system.

19. The non-transitory machine-readable medium of claim 18, wherein the first and second pseudo-epochs are smaller than a maximum progress window size, and wherein the first and second pseudo-epoch do not transition an epoch boundary.

20. The non-transitory machine-readable medium of claim 18, wherein the first portion of the first ordered event stream comprises first events stored in a first type of data storage and comprises second events stored in a second type of data storage that is a different type of data storage than the first type of data storage.

* * * * *